(12) United States Patent
Tra et al.

(10) Patent No.: US 12,032,759 B2
(45) Date of Patent: Jul. 9, 2024

(54) INFORMATION HANDLING SYSTEM COLLABORATIVE TOUCHPAD DISPLAY HARDWARE DEVICE COORDINATION

(71) Applicant: Dell Products L.P., Round Rock, TX (US)

(72) Inventors: Andelon Xuan Tra, Austin, TX (US); Barry Paul Easter, Austin, TX (US); Frank Quintanilla, Cedar Park, TX (US); Julia A. Ogbevoen, Houston, TX (US); Daniel L Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/900,323

(22) Filed: Aug. 31, 2022

(65) Prior Publication Data
US 2024/0069653 A1 Feb. 29, 2024

(51) Int. Cl.
| | | |
|---|---|---|
| *G06F 3/0354* | (2013.01) | |
| *G06F 1/16* | (2006.01) | |
| *G06F 3/038* | (2013.01) | |
| *H05B 45/10* | (2020.01) | |
| *H05B 47/11* | (2020.01) | |

(52) U.S. Cl.
CPC ........ *G06F 3/03547* (2013.01); *G06F 1/1616* (2013.01); *G06F 1/1643* (2013.01); *G06F 3/038* (2013.01); *H05B 45/10* (2020.01); *H05B 47/11* (2020.01)

(58) Field of Classification Search
CPC .. G06F 3/03547; G06F 1/1616; G06F 1/1643; G06F 3/038; H05B 47/11; H05B 45/10
See application file for complete search history.

(56) References Cited

U.S. PATENT DOCUMENTS

| | | | |
|---|---|---|---|
| 5,952,998 | A | 9/1999 | Clancy et al. |
| 7,301,532 | B1 | 11/2007 | Dobry |
| 7,847,790 | B2 | 12/2010 | Bewley et al. |
| 8,593,502 | B2 | 11/2013 | Saleh et al. |
| 8,619,112 | B2 | 12/2013 | Kristiansen et al. |
| 8,760,425 | B2 | 6/2014 | Crisan |

(Continued)

OTHER PUBLICATIONS

Engadget, "Gateway gets snazzy with glowing touchpads on EC39C and ID49C08u laptops," downloaded from https://www.engadget.com/2010-06-04-gateway-ec39c-and-id49c08u-preview.html on Apr. 29, 2023, 19 pages.

(Continued)

*Primary Examiner* — Matthew A Eason
*Assistant Examiner* — Sujit Shah
(74) *Attorney, Agent, or Firm* — Zagorin Cave LLP

(57) ABSTRACT

An information handling system touchpad includes an application area with a display to present control icons of an application executing on the information handling system, such as camera and microphone icons to control camera and microphone functions of a videoconference application. The touchpad dynamically adjusts touchpad display brightness and color based upon ambient light conditions detected by an ambient light sensor. Touchpad display brightness control is set independent of main display and keyboard backlight illumination brightness.

20 Claims, 28 Drawing Sheets

(56) References Cited

U.S. PATENT DOCUMENTS

| | | |
|---|---|---|
| 9,141,211 B2 | 9/2015 | Feng et al. |
| 9,250,738 B2 | 2/2016 | Sharma |
| 9,568,958 B2 | 2/2017 | Mine |
| 9,703,435 B2 | 7/2017 | Woolley et al. |
| 9,891,732 B2 | 2/2018 | Westerman |
| 10,031,604 B2 | 7/2018 | Kim et al. |
| 10,303,289 B2 | 5/2019 | Sepulveda et al. |
| 10,466,826 B2 | 11/2019 | Andrews et al. |
| 10,585,494 B1 | 3/2020 | Porcella et al. |
| 10,614,775 B2 | 4/2020 | Johnson et al. |
| 10,642,416 B2 | 5/2020 | Sepulveda et al. |
| 10,649,581 B1 | 5/2020 | Smith |
| 10,719,167 B2 | 7/2020 | Sepulveda et al. |
| 10,747,428 B2 | 8/2020 | Westerman |
| 10,754,603 B2 | 8/2020 | Bernstein et al. |
| 10,811,201 B1 | 10/2020 | Files et al. |
| 11,073,954 B2 | 7/2021 | Silvanto et al. |
| 11,216,091 B2 | 1/2022 | Ho et al. |
| 11,221,749 B2 | 1/2022 | Wallace et al. |
| 11,314,409 B2 | 4/2022 | Klein et al. |
| 11,334,176 B2 | 5/2022 | Hughes et al. |
| 11,429,145 B2 | 8/2022 | Sepulveda et al. |
| 11,449,224 B2 | 9/2022 | Westerman |
| 11,482,167 B1 | 10/2022 | Kuang et al. |
| 11,580,901 B2 | 2/2023 | Cogan et al. |
| 11,609,641 B2 | 3/2023 | Choi et al. |
| 11,635,928 B2 | 4/2023 | Carrigan et al. |
| 2004/0004604 A1 | 1/2004 | Numano |
| 2005/0024341 A1 | 2/2005 | Gillespie et al. |
| 2006/0026535 A1 | 2/2006 | Hotelling et al. |
| 2006/0066588 A1 | 3/2006 | Lyon et al. |
| 2008/0055265 A1 | 3/2008 | Bewley et al. |
| 2008/0218486 A1 | 9/2008 | Haseyama et al. |
| 2009/0249236 A1 | 10/2009 | Westerman et al. |
| 2010/0039764 A1 | 2/2010 | Locker et al. |
| 2010/0277422 A1 | 11/2010 | Muresianu et al. |
| 2011/0047459 A1 | 2/2011 | Van Der Westhuizen |
| 2011/0227845 A1 | 9/2011 | Lin et al. |
| 2011/0234746 A1 | 9/2011 | Saleh et al. |
| 2013/0162515 A1 | 6/2013 | Prociw et al. |
| 2013/0162539 A1 | 6/2013 | Wang et al. |
| 2013/0162571 A1 | 6/2013 | Tamegai |
| 2013/0249806 A1 | 9/2013 | Crisan |
| 2014/0137036 A1 | 5/2014 | Han |
| 2015/0370339 A1 | 12/2015 | Ligtenberg et al. |
| 2016/0011682 A1 | 1/2016 | Feng |
| 2016/0103496 A1 | 4/2016 | Degner et al. |
| 2016/0103541 A1 | 4/2016 | Andrews et al. |
| 2016/0124532 A1 | 5/2016 | Wolff et al. |
| 2016/0202778 A1 | 7/2016 | Su |
| 2016/0232114 A1* | 8/2016 | Lo .................. G06F 9/4411 |
| 2017/0010771 A1 | 1/2017 | Bernstein et al. |
| 2017/0090597 A1 | 3/2017 | Silvanto et al. |
| 2017/0090654 A1 | 3/2017 | Silvanto et al. |
| 2018/0032203 A1 | 2/2018 | Sepulveda et al. |
| 2018/0120985 A1* | 5/2018 | Wallace .................. G06F 1/169 |
| 2019/0051267 A1 | 2/2019 | Johnson et al. |
| 2019/0129473 A1 | 5/2019 | Hu et al. |
| 2019/0220134 A1 | 7/2019 | Sepulveda et al. |
| 2020/0089358 A1 | 3/2020 | Andrews et al. |
| 2020/0174653 A1 | 6/2020 | Klein et al. |
| 2020/0174660 A1 | 6/2020 | Klein et al. |
| 2020/0257403 A1 | 8/2020 | Sepulveda et al. |
| 2020/0301524 A1 | 9/2020 | Ho et al. |
| 2020/0333994 A1 | 10/2020 | Sepulveda et al. |
| 2020/0343057 A1 | 10/2020 | Files et al. |
| 2020/0348774 A1* | 11/2020 | Hsu .................. G06F 3/044 |
| 2021/0064155 A1* | 3/2021 | Huang .................. G06F 3/038 |
| 2021/0072876 A1* | 3/2021 | Nomura .............. G06F 3/04166 |
| 2021/0390903 A1 | 12/2021 | Cogan et al. |
| 2021/0405870 A1 | 12/2021 | Marsden |
| 2022/0083161 A1 | 3/2022 | Hughes et al. |
| 2022/0129147 A1 | 4/2022 | Slassi et al. |
| 2022/0217326 A1* | 7/2022 | Rodriguez .......... H04N 17/002 |
| 2022/0247919 A1* | 8/2022 | O'Leary .............. H04L 65/403 |
| 2023/0034154 A1 | 2/2023 | Choi et al. |

OTHER PUBLICATIONS

Gadgetmatch, ASUS Zenbook 13 OLED UX325: Vibrance and power in portability, downloaded from https://www.gadgetmatch.com/asus-zenbook-13-oled-ux325-vibrance-power-portability/ on Apr. 29, 2023, 12 pages.

VN Ads Shopping, LapTop ASUS Zenbook 13 OLED (UX325, 11th Gen Intel®), downloaded from https://www.vnads.net/product/9163134/laptop-asus-zenbook-13-oled-ux325-11th-gen-intel on Apr. 29, 2023, 10 pages.

Youtube, "Your Island Sunset—Don't buy this laptop . . . yet!—ASUS Zenbook UX425EA," downloaded from https://www.youtube.com/watch?v=OSJdvsNI7Wg on Apr. 29, 2023, 3 pages.

Shortcircuit, Don't buy this laptop . . . Yet!—ASUS Zenbook UX425EA, Oct. 21, 2020, https://www.youtube.com/watch?v=OSjdvsNI7Wg (Year: 2020) 1 page.

Joanna Stern, Gateway gets snazzy with glowing touchpads on EC39C and ID49C08u laptops, engadget, Jun. 4, 2010, https://www.engadget.com/2010-06-04-gateway-ec39c-and-id49c08u-preview.html (Year: 2010) 12 pages.

Apple Gamboa, ASUS Zenbook 13 OLED UX325: Vibrance and poer in portability, May 11, 2021, gadgetmatch, https://www.gadgetmatch.com/asus-zenbook-13-oled-ux325-vibrance-power-portability/ (Year: 2021) 2 pages.

* cited by examiner

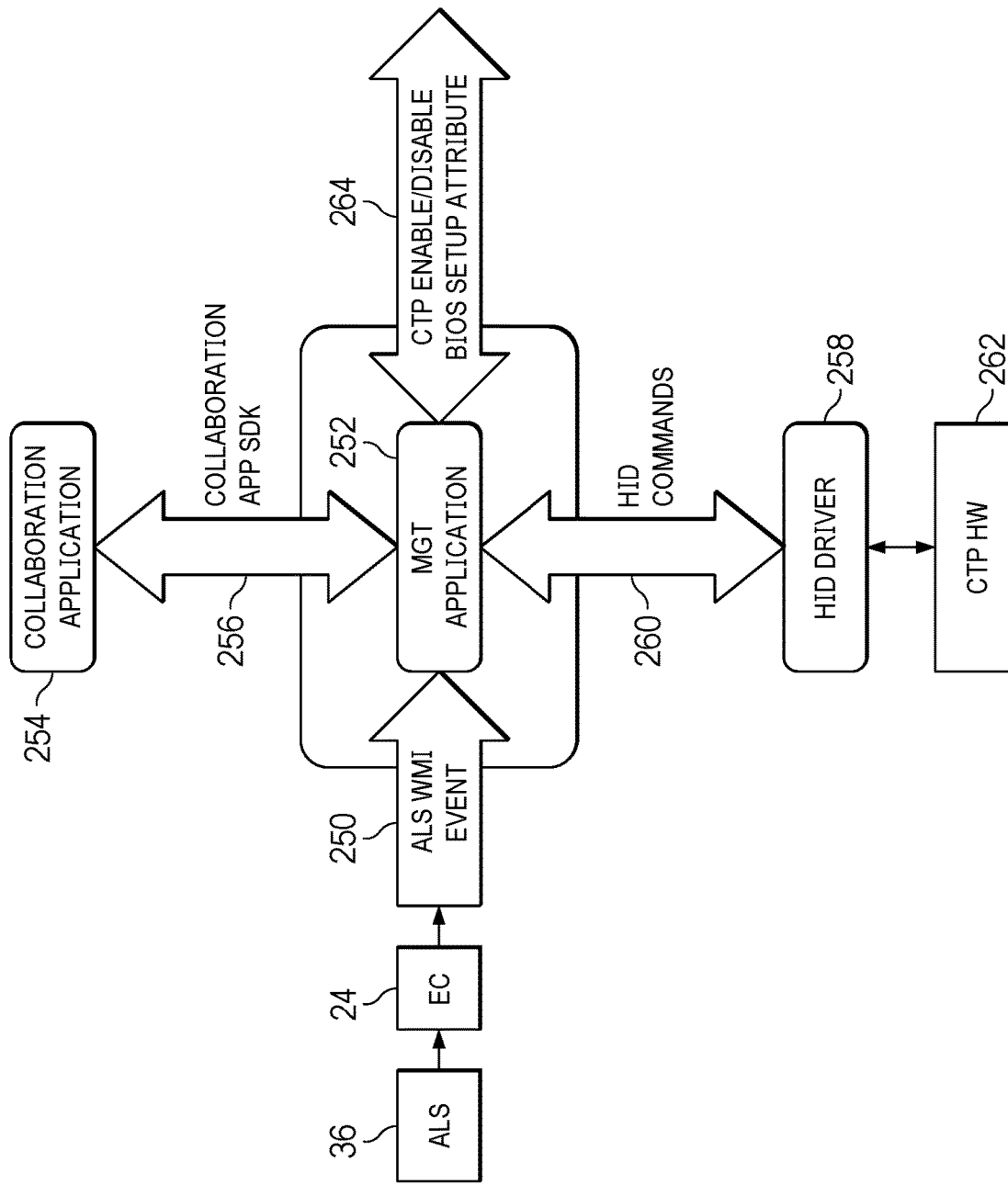

INFORMATION HANDLING SYSTEM COLLABORATIVE TOUCHPAD DISPLAY HARDWARE DEVICE COORDINATION

CROSS REFERENCE TO RELATED APPLICATIONS

This application is related to the application entitled "Information Handling System Collaborative Touchpad and Multizone Touch Rejection," naming Barry Paul Easter, Julia A. Ogbevoen, Andelon Xuan Tra, and Frank Quintanilla as inventors, filed Aug. 31, 2022, application Ser. No. 17/900,298, which application is incorporated herein by reference.

This application is related to the application entitled "Information Handling System Collaborative Touchpad Gesture Activation and Management," naming Julia A. Ogbevoen, Barry Paul Easter, Andelon Xuan Tra, and Frank Quintanilla as inventors, filed Aug. 31, 2022, application Ser. No. 17/900,302, which application is incorporated herein by reference.

This application is related to the application entitled "Information Handling System Collaborative Touchpad Dynamic Scaling," naming Barry Paul Easter, Andelon Xuan Tra, Julia A. Ogbevoen, Frank Quintanilla, Tom Brummer, and Heekwon Chon as inventors, filed Aug. 31, 2022, application Ser. No. 17/900,313, which application is incorporated herein by reference.

This application is related to the application entitled "Information Handling System Collaborative Touchpad Display Hardware Device Coordination," naming Frank Quintanilla, Barry Paul Easter, Andelon Xuan Tra, Daniel L. Hamlin, and Julia A. Ogbevoen, as inventors, filed Aug. 31, 2022, application Ser. No. 17/900,319, which application is incorporated herein by reference.

This application is related to the application entitled "Information Handling System Collaborative Touchpad Cursor Over Control Icons," naming Barry Paul Easter and Andelon Xuan Tra as inventors, filed Aug. 31, 2022 application, application Ser. No. 17/900,324, which application is incorporated herein by reference.

BACKGROUND OF THE INVENTION

Field of the Invention

The present invention relates in general to the field of portable information handling systems, and more particularly to an information handling system collaborative touchpad display brightness management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components, a keyboard and a touchpad, and rotationally couples with hinges to a lid housing portion that integrates a display. In a clamshell position, the lid housing portion rotates approximately ninety degrees to a raised position above the main housing portion so that an end user can type inputs and interact with the touchpad while viewing the display. After usage, convertible information handling systems rotate the lid housing portion over the main housing portion to protect the keyboard and display, thus reducing the system footprint for improved storage and mobility.

With the advent of increases in "work from anywhere" employment arrangements, portable information handling systems have become a powerful enterprise tool that enables a distributed work force. Remote end users typically have a home office that includes peripheral devices that enhance portable information handling system usability. For instance, a typical home office includes one or more peripheral displays that a portable information handling system couples with to have an increased screen area for presenting visual images. In addition, peripheral keyboard and mouse devices interface wirelessly with a portable information handling system to offer a more convenient full-sized keyboard and mouse than is typically available integrated in a portable information handling system. When a remote use has to travel, the portable information handling system supports mobility with full access to enterprise network resources. An end user may thus work while traveling and while at remote locations, such as customer facilities.

In remote locations, portable information handling systems are often used as communication devices, such as with video conferences that present participants through video streams at a portable information handling system. In addition to sharing participant video and audio presence, videoconferencing applications often enable sharing of documents and presentations during the video conference. Typically, videoconferencing applications that execute on the portable information handling system have graphical user interfaces that present control icons for an end user to select from available options that can include adding or removing participant, sharing a document, muting a microphone, messaging, turning a camera on and off, selecting a participant to focus on and other functions. Videoconference application controls are generally presented on part of the display that presents the videoconference, such as with a control bar of icons at the upper or lower side of the display.

One difficulty faced by end user's during videoconferences is that the video conference application will go to a full screen mode that presents a video stream without any control icons. This can lead to end users struggling to find videoconference calling features when engaged in a videoconference, particularly in complex and busy communication scenarios. For instance, a multitasking user might minimize a videoconference window to focus on other matters while passively listening to audio so that engagement with the videoconference, such as by being asked a question, can result in the end user fumbling to find controls to unmute his microphone to respond to a question. As another example, an end user might have multiple conference calling buttons on different peripherals and other devices resulting in confusion about which peripheral to use in order to engage in the conference. These types of situations tend to reduce meeting productivity and cause end user frustration.

SUMMARY OF THE INVENTION

Therefore, a need has arisen for a system and method which presents application control icons at a touch surface to accept application inputs.

A further need exists for managing a touchpad to accept both cursor inputs and application inputs associated with control icons presented at the touchpad.

A further need exists for selectively presenting and removing control icons at a touchpad display based upon application and information handling system context.

A further need exists for automated adjustment of touchpad control icon brightness independent of display and keyboard backlight illumination brightness.

A further need exists for managing touchpad display control icon status when hardware devices are set by a hardware control that prevents control icon inputs to the hardware device.

In accordance with the present invention, a system and method are provided which substantially reduce the disadvantages and problems associated with previous methods and systems for managing an application with control icons presented at a touch detection surface. A portable information handling system integrates a touchpad that accepts cursor inputs to move a cursor at a display. The touchpad includes a touchpad display under a touch detection surface that presents control icons to support inputs to an application, such as videoconference application. The touchpad simultaneously supports both cursor inputs and control icon inputs.

More specifically, a portable information handling system integrates processing components in a portable housing to process information, such as a central processing unit (CPU) that executes instructions and a random access memory (RAM) that stores the instructions and information. A touchpad integrated in the portable housing has a touch detection surface that accepts end user touches as cursor inputs. In response to execution of an application or input a gesture, such as swipe in a defined application active area, a display under the touchpad presents control icons that support functions of the application, such as camera and microphone mute for a videoconference application. Touches in the application active area are interpreted as inputs to the control icons while touches outside of the application active area are interpreted as cursor inputs. Alternatively, analysis of touchpad touches distinguishes cursor inputs and control icon inputs so that the touch detection surface of the touchpad shares both types of inputs. The brightness of the control icon presentation is managed with ambient light conditions independent of the brightness of illumination at a display and keyboard backlight.

The present invention provides a number of important technical advantages. One example of an important technical advantage is that an information handling system presenting an application user interface, such as videoconference, at a primary display has control icons presented at a touchpad display to enhance the ease with which an end user interacts with the application. The touchpad continues to accept cursor inputs while the control icons are presented and selectively presents and removes the control icons with a swipe gesture or based upon context at the information handling system. An end user experience at an information handling system is enhanced by making control of the application readily available when application control icons are removed from the application user interface, such as when the application is in full screen mode.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 14 depicts a block diagram of an example software architecture to manage touchpad control icon display brightness;

DETAILED DESCRIPTION

A portable information handling system touchpad includes a touchpad display that presents visual images, such as control icons, and adapts touchpad touch detection to support both cursor input and interactions through the visual images. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
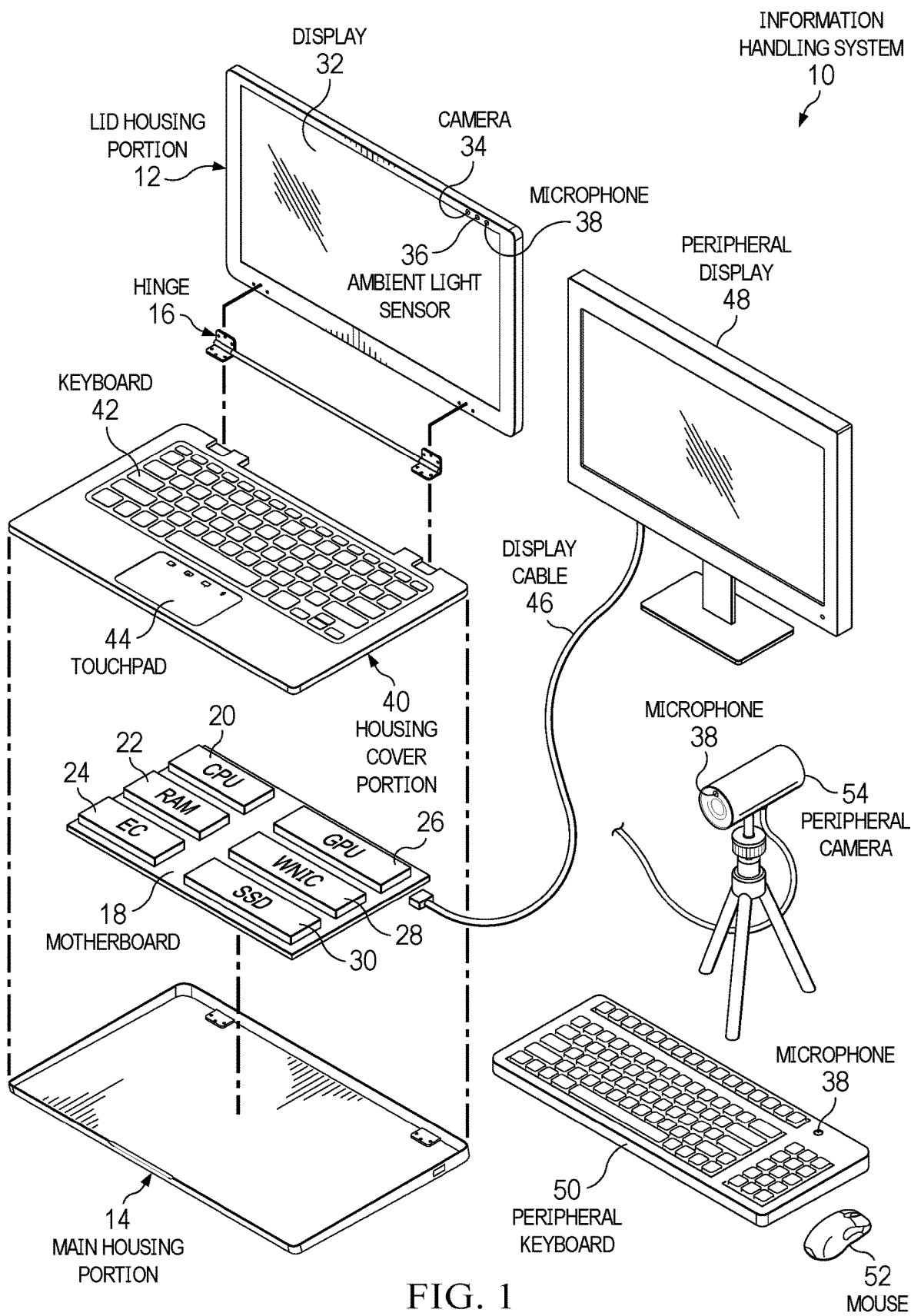
FIG. 1 depicts a portable information handling system that supports presentation of videoconference control icons at touch detection surfaces, such as at a touchpad having a touchpad display.

Referring now to FIG. 1, a portable information handling system 10 is depicted that supports presentation of videoconference control icons at touch detection surfaces, such as at a touchpad 44 having a touchpad display. In the example embodiment, information handling system 10 has a portable configuration with processing components in a portable housing to support mobile use. The portable housing has a lid housing portion 12 rotationally coupled with a main housing portion 14 by a hinge 16 that supports rotation between a closed position and an open position. A motherboard 18 couples to main housing portion 14 having a printed circuit board that interfaces the processing components to support cooperation in processing information. A central processing unit (CPU) 20 executes instructions to process information in cooperation with a random access memory (RAM) 22 that stores the instructions and information. For example, CPU 20 and RAM 22 cooperate to execute an operating system and applications, such as the WINDOWS operating system having a videoconference application to support videoconference communications. An embedded controller 24 interfaces with CPU 20 to coordinate operation of physical devices and manage operating conditions of the physical devices. For example, embedded controller 24 includes non-transitory memory that stores instructions to manage power and thermal conditions within the housing. As another example, embedded controller 24 coordinates CPU 20 access to physical devices, such as a camera 34 and microphone 38, and coordinates inputs to CPU 20 by peripheral devices, such as a peripheral keyboard 50. A graphics processing unit (GPU) 26 interfaces with CPU 20 to further process information for presentation as visual images, such as by defining a visual image with pixel values communicated to an integrated display 32 and peripheral display 48. A wireless network interface controller (WNIC) 28 supports wireless communications with external devices, such as a WiFi network or BLUETOOTH peripheral. A solid state drive (SSD) 30 provides persistent non-transient storage of information during power down states. For example, at application of power, embedded controller 24 executes a preboot code that retrieves an operating system and applications from SSD 30 to RAM 22 for execution by CPU 20.

Portable information handling system 10 has a convertible configuration in which main housing portion 14 provides a support that holds lid housing portion 12 in a raised position so that an end user can view visual images presented at display 32. A camera 34, ambient light sensor 36 and microphone 38 include in lid housing portion 12 align to face an end user viewing display 32. In this clamshell position, a housing cover portion 40 coupled to main housing portion 14 holds an integrated keyboard 42 and an integrated touchpad 44 at an upper surface in a position at which an end user can perform inputs while viewing display 32. The integrated keyboard and touchpad provide a convenient interface to support mobile use cases. In addition, peripheral devices provide more flexible user interfaces, such as with a peripheral keyboard 50 that offers full size keys for typing, a peripheral mouse 52 for cursor inputs, a peripheral camera 54 for higher quality visual images and a peripheral display 48 having a larger viewing surface area. Peripheral hardware devices may interface through wireless signals or cables, such as a display cable 46. In some instances, peripheral hardware devices may support multiple functions, such as a keyboard microphone 38 to capture audible sounds.

One difficulty that arises when performing a videoconference from information handling system 10 with an array of input devices and displays is that an end user can lose track of how to interact with the videoconference application. For example, a videoconference application may transition to a full screen mode having the video or a presentation at the full display screen area and removing control icons that manage the videoconference application, such as control icons to mute the microphone, turn the camera on and off, and hang up from the videoconference. When this happens, end users may become confused and fumble with the information handling system trying to find the control icons. Unfortunately, end user access to control icons tends to arise in unexpected manners, such as trying to unmute when asked a question or mute when a loud noise occurs at a home office. To address this difficulty, the present disclosure provides a control icon user interface that is presented at a secondary display to accept control inputs for the videoconference application. In the example embodiment, the control icons may be presented at a touchpad display integrated under a touch detection surface of touchpad 44. The plural control icons may be presented when the video conference application is active or just when the primary user interface of the video conference removes the control icons, such as with a full screen presentation. An end user thereby has control icons present and visible at all times and may tap the control icons presented at the touchpad display to perform application control functions, such as turning a camera on and off, muting and unmuting a microphone, hanging up, sharing a document, and similar control functions. As described in greater depth, control icons may be presented at alternative display devices, such as tablet information handling systems or secondary displays.

Figure 2:
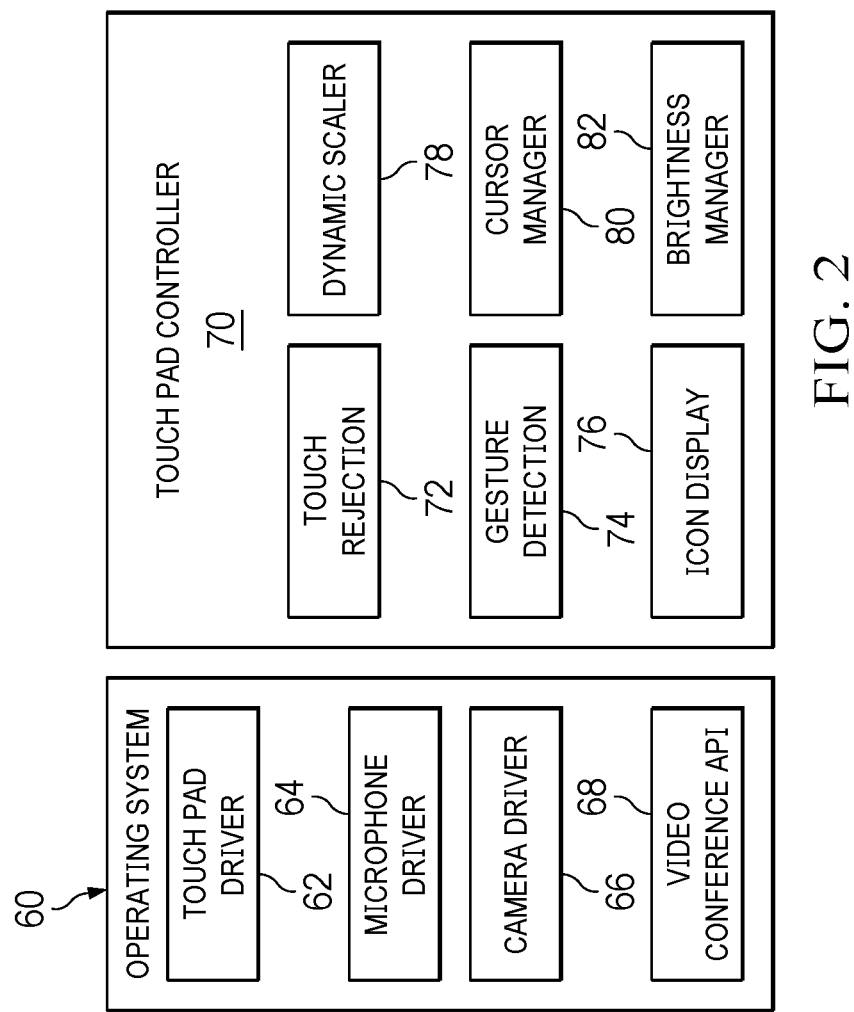
FIG. 2 depicts a block diagram of a system for presenting an application's control icons at a touchpad display.

Referring now to FIG. 2, a block diagram depicts a system for presenting an application's control icons at a touchpad display. In the example embodiment, the control icons support control of a videoconference application, however, in alternative embodiments other types of applications may be controlled and other types of displays may be used to present the control icons. An operating system 60 and touchpad controller 70 cooperate to support presentation of control icons for an application running over operating system 60. The cooperation may include communications through an embedded controller or other interfaces, such as with a CPU Integrated Sensor Hub (ISH) and a management application executing over the operating system. Operating system 60 coordinates interactions of the videoconference application with the touchpad and various hardware devices, such as microphone, camera and ambient light sensor, through various drivers that support hardware interfaces of the hardware devices. For instance, a touchpad driver 62 receives touch input information from touchpad controller 70 and applies the touch input information for cursor control at a display, such as moving a cursor responsive to the touches and recording an enter at a tap or double tap. A microphone driver 64 translates application microphone inputs, such as mute and unmute, into hardware device commands communicated to a microphone. A camera driver 66 translates application camera inputs into hardware device commands communicated to a camera. A videoconference application programming interface (API) provides hooks for a videoconference application running over the operating system to access the hardware devices. In alternative embodiments, other APIs may support other types of applications and hardware devices.

Touchpad controller 70 is a processing resource, such as a microcontroller unit (MCU), that includes non-transitory memory to store instructions, such as an integrated flash memory. A touch rejection module 72 analyzes touches to isolate out unintended inputs so that cursor inputs reported to operating 60 are accurate to an end user's intention. For instance, when an end user types at an integrated keyboard with a palm resting on the touchpad touch detection surface, the placement of the palm and detection of typing allows rejection of the touchpad touches as not intended as an input. Touch rejection module 72 includes instructions that analyzes touches to distinguish between cursor inputs and touch display inputs. In one example embodiment, an application area is defined in which the touchpad display presents application visual images so that touches within the application area are interpreted at application control icon inputs while touches outside of the application area are interpreted at cursor inputs. For instance, a first set of instructions analyzes touches in the application area based upon the location and type of visual images presented at the touchpad display while a second set of instructions analyzes touches as cursor inputs outside of the application area. Such an arrangement treats all touches in the application area as application inputs and all touches outside of the application area as cursor inputs managed by cursor input touch rejection logic. Alternatively, the entire touch detection surface may provide cursor inputs that have a different touch rejection when the touchpad display presents visual images. For instance, when touchpad display images are presented, a finger tap or double tap within a defined distance of an icon is interpreted as an input to the icon while finger drags across the visual images are interpreted as cursor inputs. In one embodiment, only a tap and/or a double tap is interpreted as a control icon input in an application area while control icons are present while all other touches are managed as cursor inputs with cursor input touch rejection logic.

A gesture detection module 74 includes instructions that detect defined gestures as inputs for selection of a cursor input mode and/or a touchpad display input mode. For instance a swipe in an application area of the touchpad commands presentation and removal of application control icons at the touchpad display. In one example embodiment, the application area is defined as the strip of touchpad touch detection surface adjacent to the keyboard and the gesture is detected by a swipe only in the application area. The swipe may indicate presentation of application icons when performed in a first direction and removal of the application icons when performed in a second opposite direction. In some example embodiments, different sets of gestures may act as different types of inputs based upon detection in the application area or the cursor input area. For instance, a circle in the application area might adjust touchpad display brightness while a circle outside the application area might change the orientation of a highlighted image. A dynamic scaler module 78 includes instructions that adjust the size of an application area of a touchpad display, such as between off with no size and on with a portion of the touchpad touch detection surface area defined as the application area. In one embodiment, gestures detected by gesture detection module 74 adjusts the size of the application area and size of the presented control icons in cooperation with dynamic scaler module 78. A cursor manager 80 detects cursor inputs by tracking finger drags and taps as enter commands to report the cursor inputs to operating system 60 for command cursor movements. An icon display module 76 manages presentation of control icons when the application area is active, such as based upon an application being supported by the touchpad display. A brightness manager 82 manages illumination of the icon display, such as based upon sensed ambient light conditions and operating conditions at the information handling system.

Figure 3:
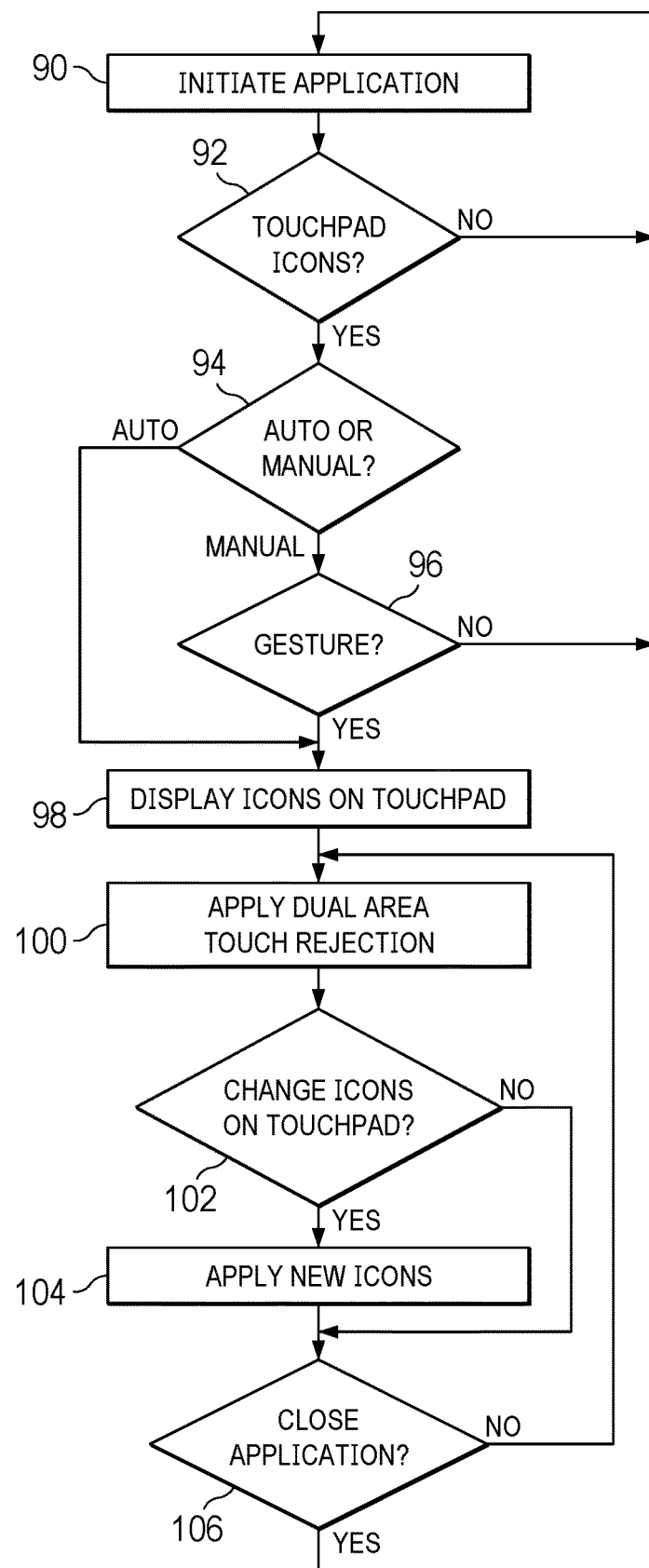
FIG. 3 depicts a flow diagram of a process for managing application control icon presentation at a touchpad display.

Referring now to FIG. 3, a flow diagram depicts a process for managing application control icon presentation at a touchpad display. The process starts at step 90 with initiation of an application that includes support for presentation of control icons at a touchpad or other secondary display. For instance, as described above, a videoconference application initiates at a CPU to support videoconference communication with a camera, microphone and wireless networking device. At step 92, a determination is made of whether the application has touchpad icons, such as by comparing the application against a list of applications that support touchpad icons. If not, the process returns to step 90. If touchpad icons are supported, the process continues to step 94 to determine if presentation of the touchpad icons is automated or manual, such as based upon an end user configuration for the application. If the presentation of touchpad icons is manual, the process continues to step 96 to determine if a gesture is performed that commands presentation of the application control icons. For example, the gesture is a swipe in a defined application area of the touchpad. If the control icons are presented in response to the gesture, the process waits for the gesture and returns to step 90 when the application closes. If the presentation of application control icons is automated or commanded by a gesture, the process continues to step 98 to present the application control icons on the touchpad. In one example embodiment, the automated presentation of the application control icons may be based upon conditions at the information handling system or the application. For instance, in one example embodiment, a videoconference application will present the application control icons at the touchpad when not presented to the main user interface and will remove the application control icons when they are presented at the main user interface. As is described in greater depth below, the application control icons may alternatively be presented at other types of displays, such as a tablet information handling system.

Once the application control icons are presented at the touchpad display at step 98, the process continues to step 100 to apply a dual area touch rejection logic. As is described in greater detail below, the touch logic may divide the touchpad into separate areas so that an application area that shows the control icons only accepts inputs to the application and/or to the application icons while the touchpad surface area outside the application area accepts cursor inputs. Alternatively, cursor inputs may be supported across the entire touchpad touch detection surface area while application control icon logic isolates and reports input touches to the control icons. At step 102, a determination is made of whether the type of application control icons or the order presented for the control icons has changed. For instance, a default for the videoconference control icon presentation may include camera on/off, microphone mute/unmute, document share and hang up control icons. In one embodiment, the order of presentation for the control icons may be changed to match the order presented by the application. In another example embodiment, an end user might adjust the order of the control icons with gestures in the application area, such as pressing and holding then dragging the control icon to a new location. In another example embodiment, a gesture in the application area may select different control icons for presentation, such as by sliding or flicking the presented control icons to bring different control icons up for presentation. If a change in presentation of control icons is selected, the process continues to step 104 to apply the new selection. When the desired control icons are presented, the process continues to step 106 to determine if the application has closed. While the application remains open, the process returns to step 100 to apply the dual area touch rejection. Once the application closes the process removes the control icons from presentation and returns to step 90.

Figure 4A:
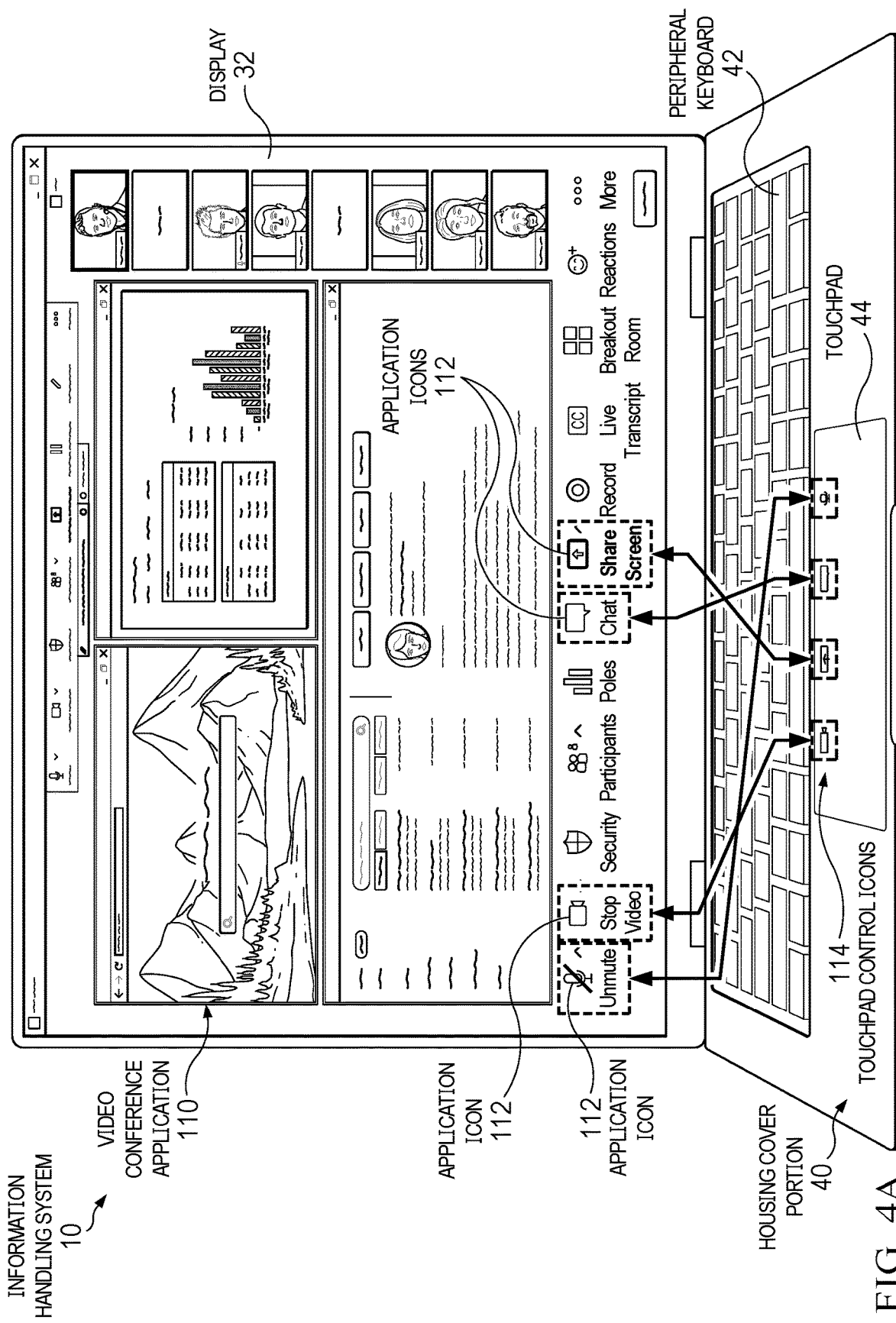
FIG. 4A depicts a front view of an information handling system 10 showing a videoconference application at a display with the videoconference supported by control icons presented at a touchpad.

Referring now to FIG. 4A, a front view of an information handling system 10 depicts a videoconference application 110 at a display 32 showing a videoconference supported by control icons 114 presented at a touchpad 44. In the example embodiment, control icons 114 correspond to application icons 112 presented as part of videoconference application 110, to include camera on/off icon, a share screen icon, a chat icon and a microphone mute/unmute icon. An end user has the option of interacting with videoconference application 110 through keyboard 42, with cursor movements by touchpad 44 to select application icons 112 and by touching a desired control icon 114. As described above, touch rejection at touchpad 44 may adjust based upon the end user placement housing cover portion 40, interactions with keyboard 42, touches at touchpad 44 and context of videoconference application 110, such as whether an end user is engaged in conversation, has the camera on or off, has the mute on or off, and other factors. In one example embodiment, application icons 112 are removed to provide a full screen view of the videoconference content. In such an embodiment, control icons 114 may be presented when application icons are removed and removed when application icons 112 are presented.

Figure 4B:
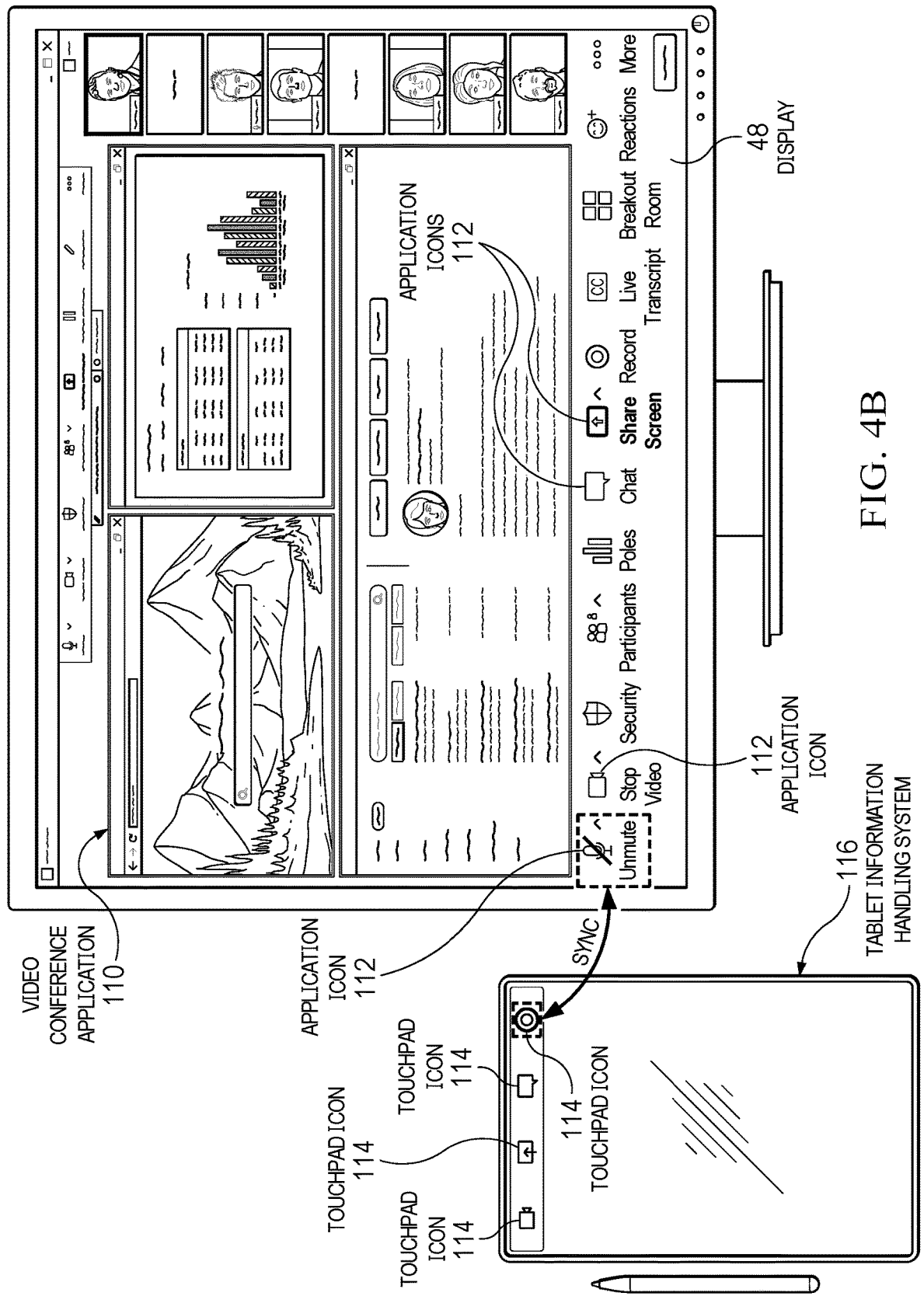
FIG. 4B depicts an alternative embodiment presenting the videoconference application at a peripheral display and control icons at a tablet information handling system when the portable information handling system lid housing portion closes.

Referring now FIG. 4B, an alternative embodiment presents the videoconference application 110 at a peripheral display 48 and control icons 114 at a tablet information handling system 116 when the portable information handling system lid housing portion closes. For example, an end user docks the portable information handling system or closes the system lid so that the touchpad is hidden from end user access and the videoconference is presented at a peripheral display coupled to the information handling system. Alternatively, a desktop information handling system that does not have a touchpad may present the videoconference application. Application icons 112 presented at the bottom of videoconference application 110 of peripheral display 48 are presented as control icons 114 of a tablet information handling system 116 so that the end user may interact with the videoconference application through the secondary device, such as with a WiFi, Bluetooth or video sharing protocol. As the videoconference status changes, such as with a camera turned on and off or a microphone muted or unmuted, the status of the control icons and application icons are synchronized to provide an accurate device state.

Figure 5:
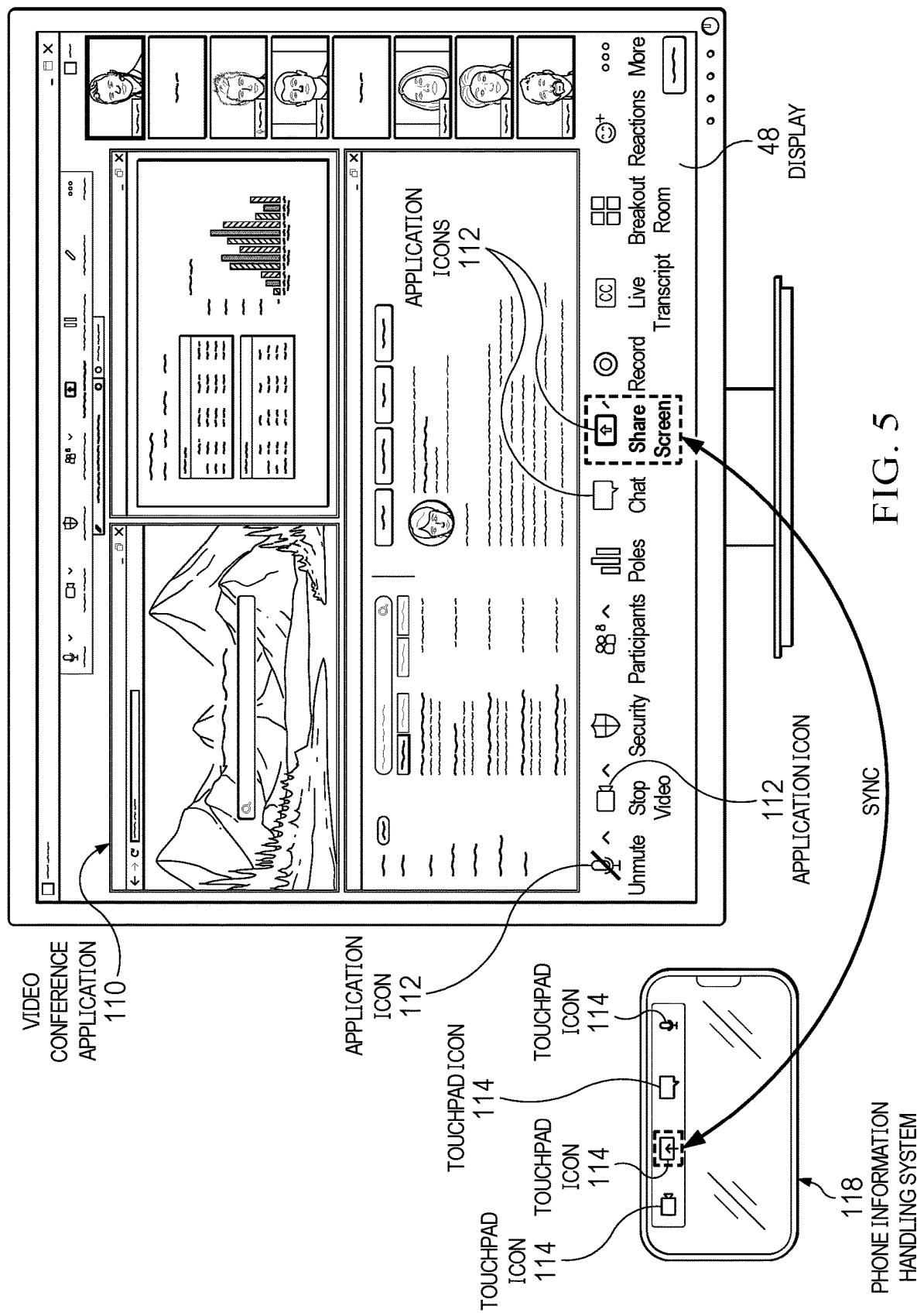
FIG. 5 depicts an alternative embodiment having the videoconference application presented at a peripheral display and control icons at a smartphone tablet information handling system.

Referring now to FIG. 5, an alternative embodiment presents the videoconference application 110 at a peripheral display 48 and control icons 114 at a smartphone tablet information handling system 118. For example, when the portable information handling system is docked or presenting the video conference from a peripheral display while the lid housing portion is closed, control icons 114 are presented in an application portion of the smartphone information handling system 118 so that the end user can control the videoconference by touching control icons 114. Application control icons 114 may present over the screen saver of smartphone information handling system 118 with the presentation limited to those time periods when application icons 112 are not visible so that phone batter impact is reduced. Smartphone information handling system 118 may receive the command to present application control icons 114 through BLUETOOTH or other wireless communications. In one embodiment, smartphone information handling system 118 executes the videoconference application for presentation at peripheral display 48 and retains control icons 114 at the integrated touchscreen to manage the videoconference.

Figure 6:
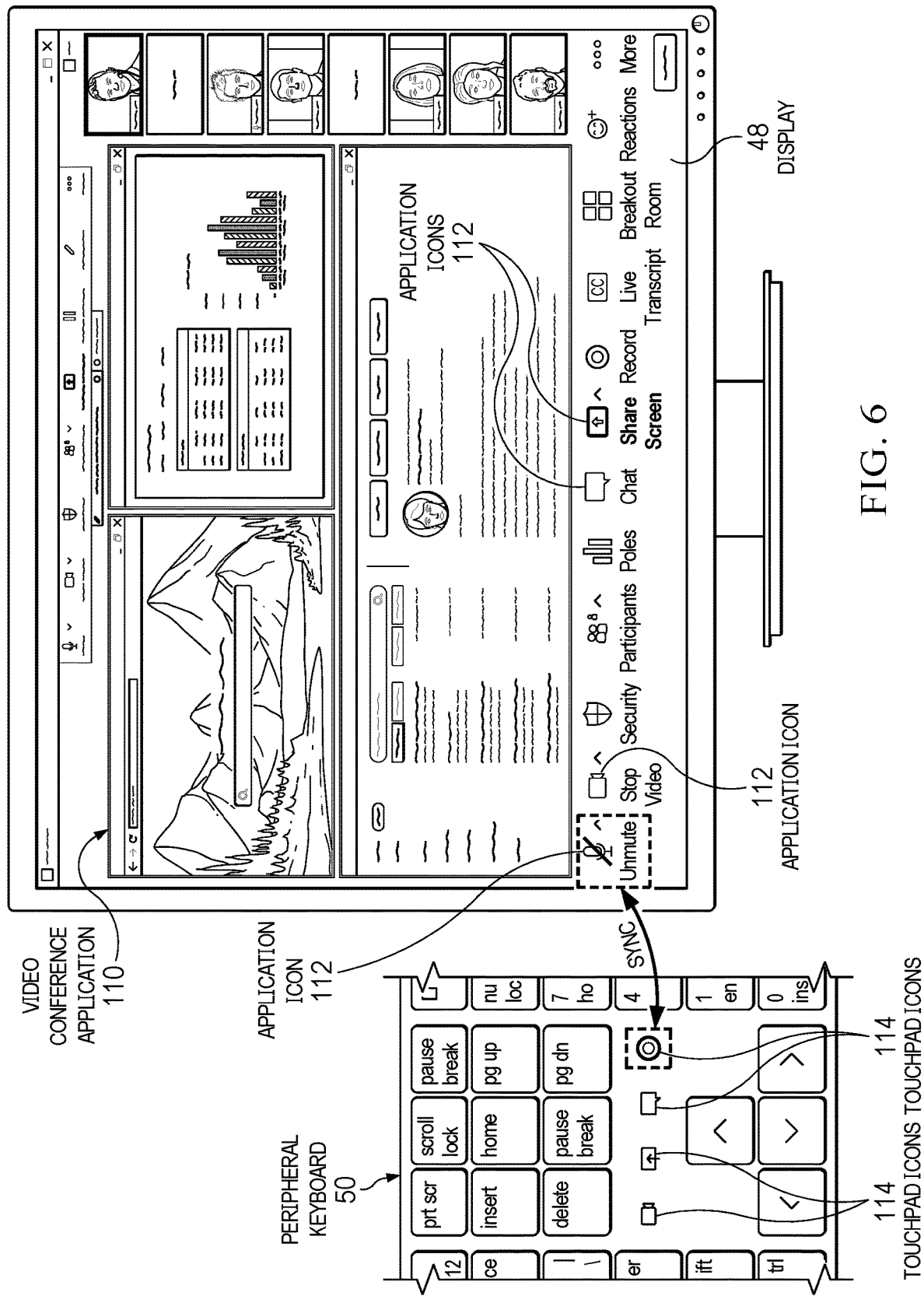
FIG. 6 depicts an alternative embodiment that presents the videoconference application at a peripheral display and control icons at a keyboard integrated display.

Referring now to FIG. 6, an alternative embodiment presents the videoconference application 110 at a peripheral display 48 and control icons 114 at a keyboard 50 integrated display. In the example embodiment, control icons 114 are presented in keyboard 50 between the QWERTY portion and the number pad portion just above cursor arrow controls and below page up and down controls. The keyboard display is, for instance, a light guide formed to show the control icons and illuminated when the videoconference application 110 executes on an information handling system interfaced with the keyboard. In the example embodiment, as with the control icon presentations described above, control icons 114 may present with a first color, such as white, to indicate a first state, such as camera and microphone on; and with a second color, such as red, to indicate a second state, such as camera and microphone off. In alternative embodiments, keyboard 50 may be integrated in a touchscreen display, such as an LCD, OLED or electronic ink display, to present the control icons in addition to other information. For instance, control icons 114 may be presented by an integrated display that also presents a number pad or other types of visual information. In one embodiment, the order control icons are automatically adjusted to match the order in which the application icons are presented.

Figure 7:
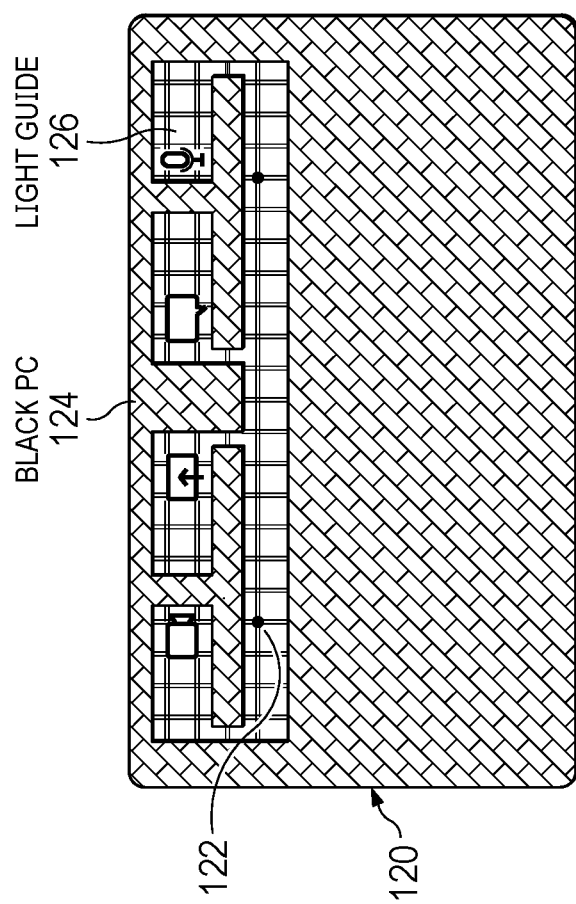
FIG. 7 depicts a top view of an example of a light guide film applied under a touchpad touch detection surface to present control icons.

Referring now to FIG. 7, a top view depicts an example of a light guide film used as a touchpad display 120 applied under a touchpad touch detection surface to present control icons. A light pipe 122 directs illumination to the illuminated portions 126 that highlight the control icons in black portions 124 placed over the illuminated portions. In the example embodiment, when illumination is directed through light pipe 122, the illumination highlights a camera icon, a share icon, a message icon and a microphone icon. When the control icons illuminate, the portion of the touchpad around the control icons applies touches as inputs to the control icons while applying touches outside the area of the control icons as cursor inputs. The control icons may, for instance, detect an input as a tap or double tap within a defined distance of an illuminated control icon. The detected input may be analyzed locally by a processing resource of the touchpad or the touch position may be reported to an embedded controller or CPU for application as a control icon input. In alternative embodiments, other types of touchpad displays may be used, such as an LCD, OLED, electronic ink or other type of display.

Figure 8:
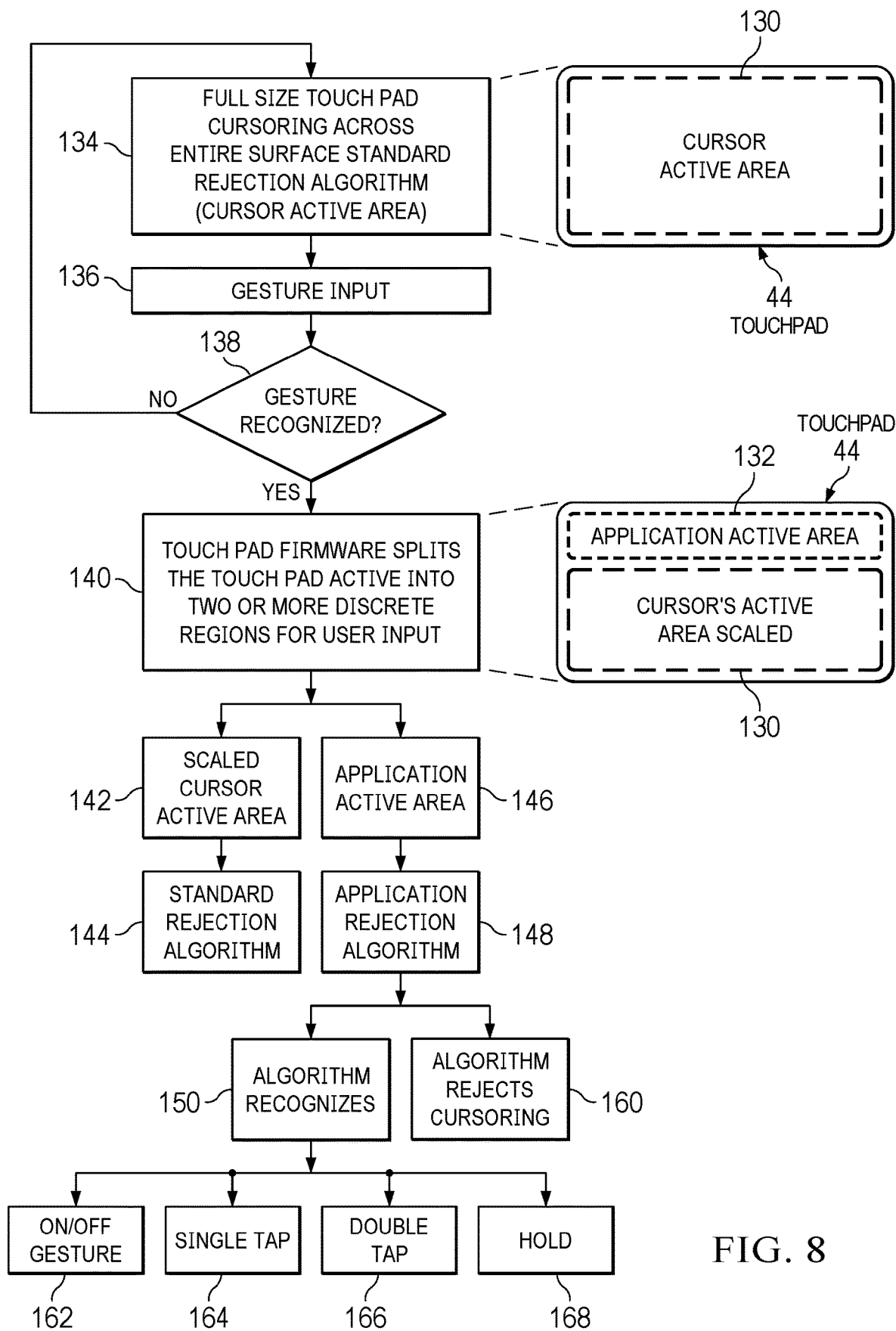
FIG. 8 depicts a flow diagram of a process for applying a multi-zone touch rejection algorithm based upon presentation of application control icons at a touchpad display.

Referring now to FIG. 8, a flow diagram depicts a process for applying a multi-zone touch rejection algorithm based upon presentation of application control icons at a touchpad display. The process starts with touchpad 44 in a cursor input mode having the entire touch detection surface 130 assigned to accept cursor inputs, such as applying finger drag movements to move a cursor and finger taps as enter commands. In the cursor input mode, other types of functions may be supported, such as accepting gestures like circular motions and double finger inputs. At step 134 the full size touch pad touch detection surface applies cursoring across the entire surface with a conventional touch rejection algorithm, such as to reject palm touches or to reject touches when typing is active. At step 136 a gesture input is detected to indicate a selection of presentation of control icons at the touchpad, such as a swipe in the area of touchpad at which the control icon presentation is desired. For instance, control icons may be presented by default in a top part of the touchpad display adjacent the keyboard, or may be presented vertically along a side of touchpad display in response to a vertical swipe. At step 138 if the gesture is not recognized the process returns to step 134; if the gesture is recognized as a command to present the control icons, the process continues to step 140. Although the present embodiment presents control icons in response to a gesture, alternative embodiments may automatically present the control icons when the application initiates, such as a videoconference application, or when the control icons are removed from presentation of an application due to a full screen mode.

At step 140, the touchpad firmware, such as instructions stored in non-transitory memory of a processing resource, splits the touchpad touch detection surface into two discrete regions that each manage touch inputs with an associated set of instructions. In the example embodiment, touchpad 44 has an application active area 132 in which the control icons are presented and cursor active area 130 that is defined outside of the application active area. For example, the touch detection surface defines touches at the location of control icons as control icon inputs and touches outside of the application active area as cursor inputs. In one example embodiment, the size and location of the application active area 132 may be adjusted with a gesture at the touchpad, such as a touch and hold or a circular motion that increases the control icon size or changes the order of the control icon. From step 140, cursor active area touch inputs are processed with a first set of instructions at step 142 within the scaled down area of the cursor active area. At step 144, a standard touch rejection algorithm is applied in the cursor active area, such as the same algorithm as is used at step 134. From step 140, in the application active area touches are managed with a second set of instructions starting at step 146, which defines the touch detection surface associated with control icon presentation as application active area 132. At step 148 an application rejection algorithm is applied in the application active area, such as an algorithm that only recognizes touches that tap or double tap a control icon. At step 150, the application active area or control icon algorithm recognizes defined touches that provide an input to the application. In the example embodiment, the defined touches include and on/off gesture 162 to command the application active area on and off, a single tap gesture 164 that indicates an input at a control icon, a double tap gesture 166 that indicates an input to a control icon and a press and hold gesture 168 that may be used to rearrange control icon positions. At step 160, the application rejection algorithm rejects cursoring inputs that cross from the cursor active area into the application active area.

Figure 9B:
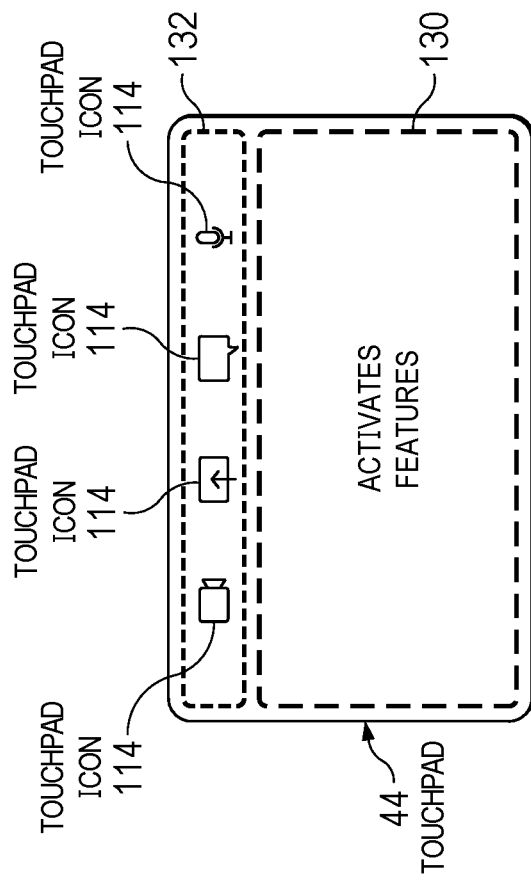
FIGS. 9A and 9B depict an example embodiment of a gesture to command presentation of application control icons at a touchpad having a touchpad display.
Figure 9A:
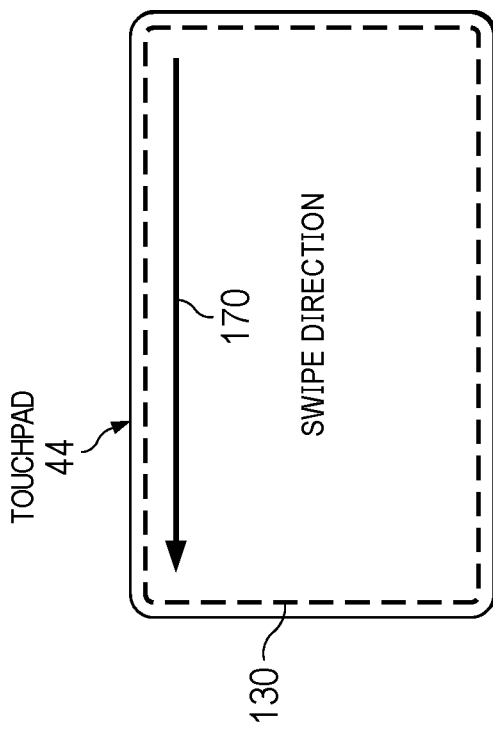

Referring now to FIGS. 9A and 9B, an example embodiment depicts a gesture to command presentation of application control icons at a touchpad 44 having a touchpad display. FIG. 9A depicts an arrow 170 showing a swipe direction and location for an end user finger swipe to command activation from a cursor active area 130 for presentation of control icons 114 in an application active area 132. FIG. 9B depicts control icons 114 presented in the application active area 132 and the touchpad 44 dynamically scaled to accept cursor inputs in the cursor active area. In the example embodiment, the swipe 170 to command the gesture is performed with contact only in the application active area 132 so that an inadvertent command to present the control icons is not made. Further, the gesture may be ignored if an application associated with presentation of control icons is not active at the time of the swipe.

Figure 10A:
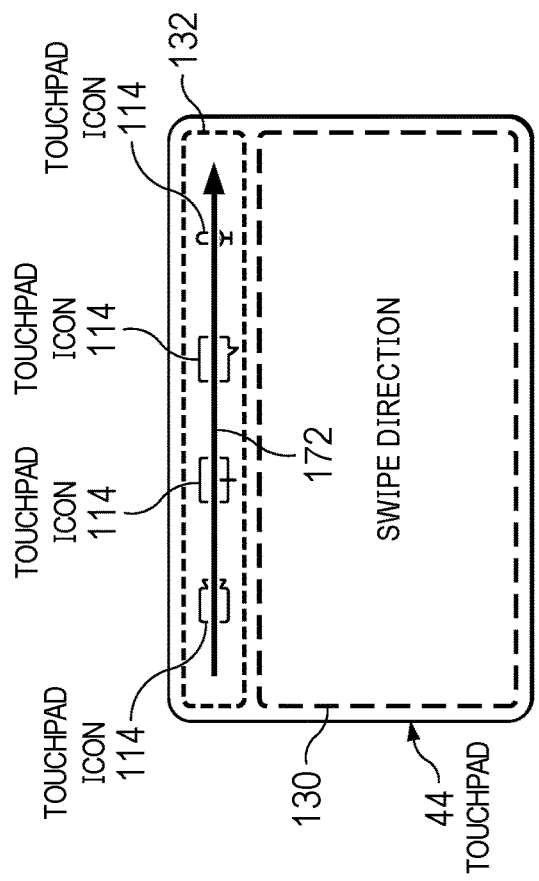
FIGS. 10A and 10B depict an example embodiment of a gesture to command removal of presentation of application control icons at a touchpad having a touch pad display.
Figure 10B:
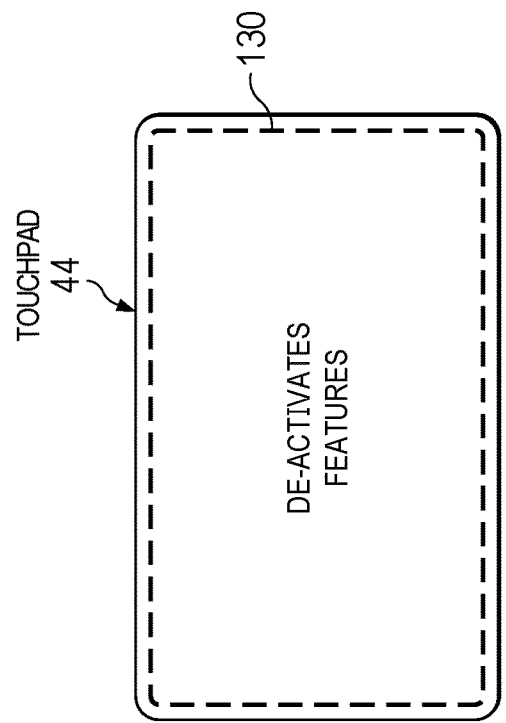

Referring now to FIGS. 10A and 10B, an example embodiment depicts a gesture to command removal of presentation of application control icons at a touchpad 44 having a touch pad display. FIG. 10A depicts a swipe direction 172 across the application active area 132 to command removal of control icons 114 and close application active area 132 so that the full surface area of touchpad 44 is for the cursor active area 130, as is shown by FIG. 10B. The command swipe direction 172 to remove the control icons from presentation in the example embodiment involves a swipe that falls only in the application active area 132. In alternative embodiments, other types of gestures may be used to command presentation and removal of the control icons at the touchpad display.

Figure 11:
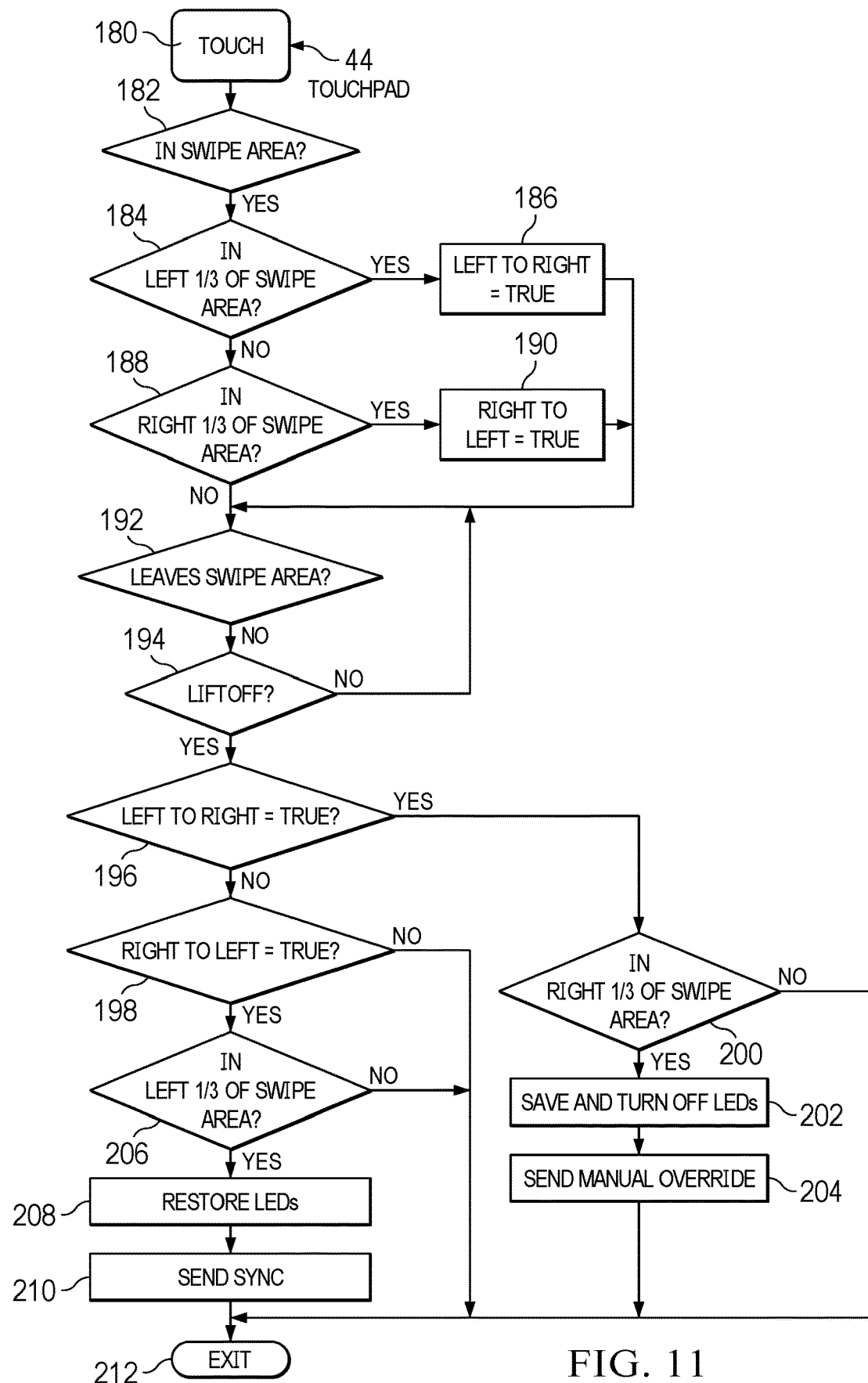
FIG. 11 depicts a flow diagram of a process for application of gestures at a touchpad to select control icons for presentation and removal.

Referring now to FIG. 11, a flow diagram depicts a process for application of gestures at a touchpad to select control icons for presentation and removal. The process starts at step 180 with end user interaction with touchpad 44. At step 182 a determination is made of whether the end user touch is in the swipe gesture area and, if not, the process returns to step 180. If the finger is in the swipe gesture area, the process continues to step 184 to determine if the touch is in the left one-third of the swipe area. If yes, at step 186 a left-to-right variable is set to true and the process continues to step 192. If the finger does not start the swipe in the left one-third at step 184, the process continues to step 188 to determine if the swipe starts in the right one-third of the swipe area. If yes, the process continues to step 190 to set a right-to-left variable to true and continues to step 192. At step 192, a determination is made of whether the finger has left the swipe area and, at step 194 a determination is made of a lift off location of the finger. The process loops through steps 192 and 194 until liftoff is detected. Once lift off of the finger is detected, the process continues to step 196 to determine if the left-to-right variable is true. If so, the process continues to step 200 to determine if a gesture has commanded removal of the control icons from the touchpad display. At step 200 a determination is made of whether the liftoff is in the right one-third of the swipe area so that the total swipe distance is at least through the middle third of the swipe length at the touchpad display. If not, the process ends at step 212. If the liftoff is in the right one-third of the touchpad, the process continues to step 202 to save the command and turn off the touchpad LEDs that illuminate the touchpad display. At step 204 the manual override command is sent to turn off the control icons rather than waiting for the application execution to end and the process exits at step 212. If at step 196 the left-to-right variable is not true, the process continues to step 198 to determine if the right-to-left variable is true. If not the process exits at step 212. If true, the process continues to step 206 to determine if the liftoff is in the left one-third of the swipe area. If not, the process exits at step 212. If yes, the process continues to step 208 to turn on the control icon LED and illuminate the control icons and to step 210 to synchronize the control icon state with the state of the hardware device associated with each control icon, such as the microphone and camera on and off. The process then exits at step 212.

Figure 12:
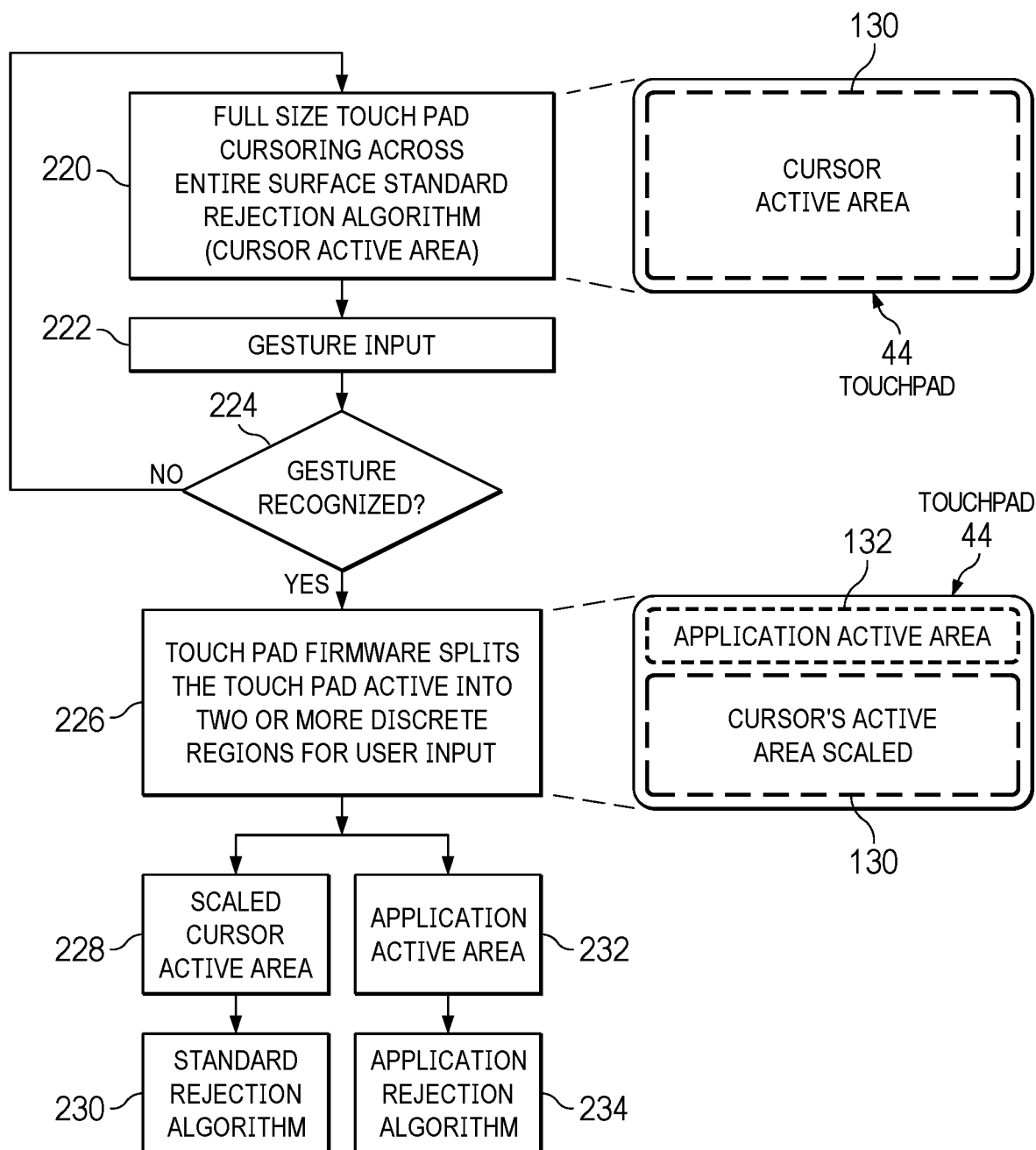
FIG. 12 depicts a flow diagram of a process for dynamic scaling of a touch detection surface to define touch areas of cursor inputs and control icon inputs.

Referring now to FIG. 12, a flow diagram depicts a process for dynamic scaling of a touch detection surface to define touch areas of cursor inputs and control icon inputs. The process starts at step 220 with touchpad 44 configured to have the full touch detection surface as a cursor active area to detect cursor inputs. For example, a cursor input touch rejection algorithm is applied to detect and report cursor inputs to the information handling system embedded controller and/or CPU. At step 222 a gesture input is touched at the touchpad and at step 224 a determination is made of whether the gesture commands a dynamic scaling of the size of the cursor input area. If not, the process returns to step 220. If the gesture commands a dynamic scaling of the touch detection surface, such as with the gesture in the process of FIG. 11 described above, the process continues to step 226 at which the touchpad firmware splits the touch detection surface into two or more discrete regions to accept user touch inputs with each region having touches analyzed by a defined algorithm of a set of instructions. In the example embodiment, the touch detection surface area defines an application active area 132 associated with the presentation of the control icons and a smaller cursor input area of less than the full touch detection surface. In various embodiments various sizes of the defined regions may be used. In one embodiment, a gesture at the touchpad may command a change in size of the regions, such as a left or right circle in the application active area to increase or decrease the icon sizes. Once the dynamic touch areas are defined, the process continues to step 232 to apply application active area logic to detected touches and to step 234 to apply the application active area touch rejection logic. From step 226, the process continues to step 228 to apply the cursor touch detection logic for the reduce cursor touch detection area and to step 230 to apply the cursor touch rejection algorithm.

Figure 13:
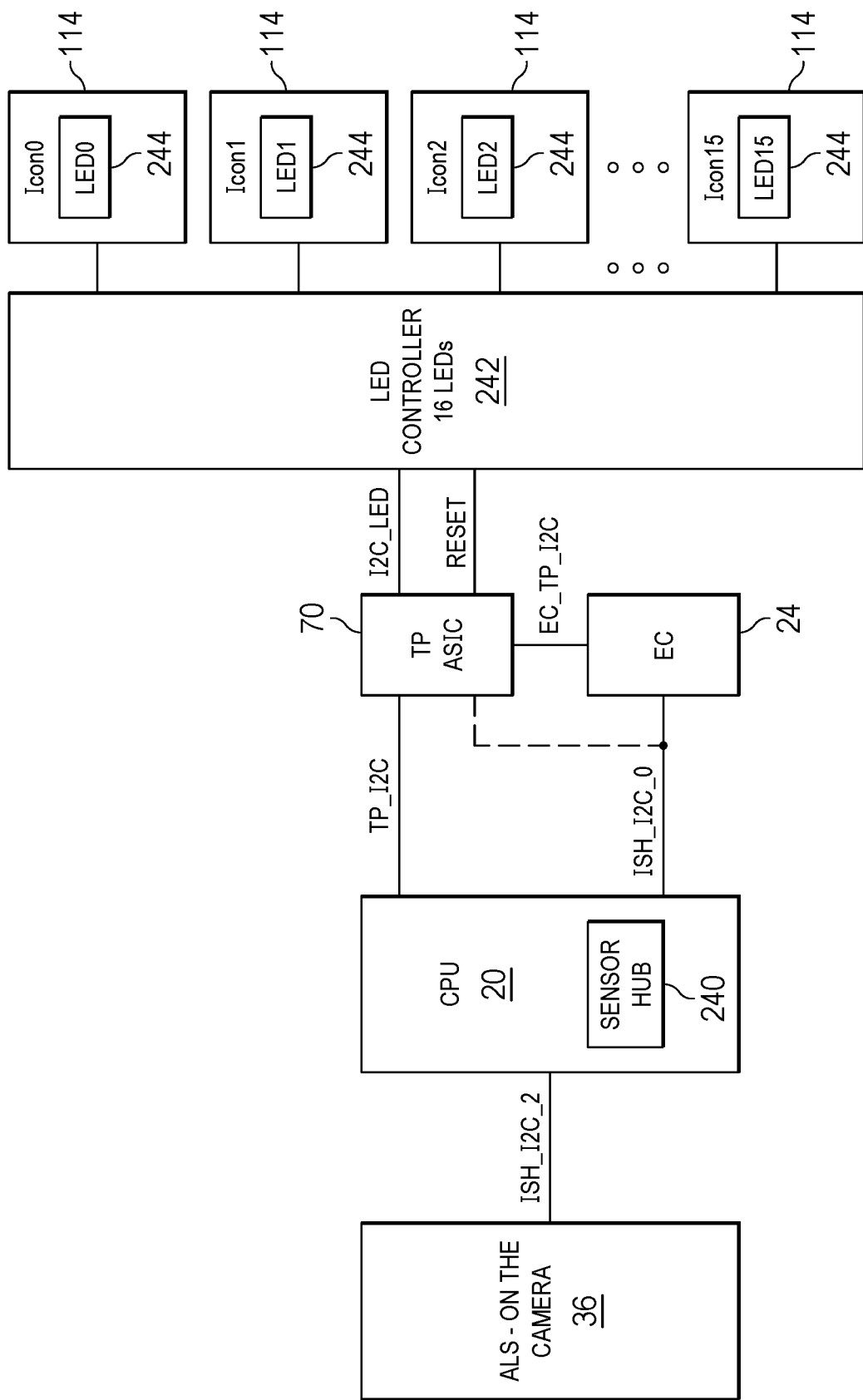
FIG. 13 depicts a block diagram of information handling system processing components configured to adjust touchpad display control icon presentation brightness.

Referring now to FIG. 13, a block diagram depicts information handling system processing components configured to adjust touchpad display control icon presentation brightness. An ambient light sensor 36 integrated in the information handling system detects ambient light conditions, such as brightness and color temperature, and communicates the ambient light conditions to CPU 20 integrated sensor hub (ISH) 240. In the example embodiment, CPU 20 communicates directly with a touchpad processing resource 70, such as an ASIC or MCU, and also with an embedded controller 24. The ambient light sensor ambient conditions are thus available to a management application running over CPU 20 and to firmware of embedded control 24. The ambient light conditions are applied to set display brightness and also to set keyboard backlight illumination brightness. In the example embodiment, ambient light conditions communicated to touchpad processing resource 70 are applied to set brightness of an LED controller 242 that illuminates LEDs 244 for each of control icons 114. In various alternative embodiments, LED brightness may also be adjusted with control through embedded controller 24 or by other processing resources. The control icon LED brightness adjustments may take into account not just ambient light conditions but also the amount of illumination applied at a keyboard backlight and at a display and also ambient color conditions. In one embodiment, touchpad processing resource 70 executes instructions to detect gestures that can manually change touchpad display illumination brightness, such as left and right circular rotations. The example embodiment addresses LED backlights to illuminate a light pipe control icon presentation, however, LCD backlights and OLED illumination may also be adjusted when used under the touchpad as a touchpad display.

Referring now to FIG. 14, a block diagram depicts an example software architecture to manage touchpad control icon display brightness. In the example embodiment, ambient light sensor 36 communicates to embedded controller 24 when a change in ambient light is detected. Embedded controller 24 waits until an alert issues of a change in ambient light levels and, when alert is received from ambient light sensor 36, embedded controller 24 instructs the system BIOS to issue a Windows Management Instrumentation (WMI) event 250. The ambient light sensor WMI event 250 is broadcast to all hardware devices that listen for it, such as keyboard backlight controller and a touchpad backlight controller. In the example embodiment, a management application 252 executing on the CPU, such as the DELL Optimizer, listens for changes in the ambient light levels to coordinate hardware device responses to changes in the ambient light. Management application 252 responds to the WMI event by referencing a lookup table to determine which level of touchpad LED illumination should be set for the ambient light conditions. For instance, a collaborative application SDK interface 256 inquires with a collaboration application 254 to determine the appropriate touchpad LED illumination level setting. For instance, HID commands 260 are communicated to HID driver 258 of the operating system to command the LED illumination brightness setting at touchpad hardware 262, such as the touchpad processing resource and LED controller described in FIG. 13. Management application 252 includes a touchpad interface 264 that enables and disables BIOS setup attributes for managing touchpad operations, such as to permit manual control of brightness settings.

Figure 15A:
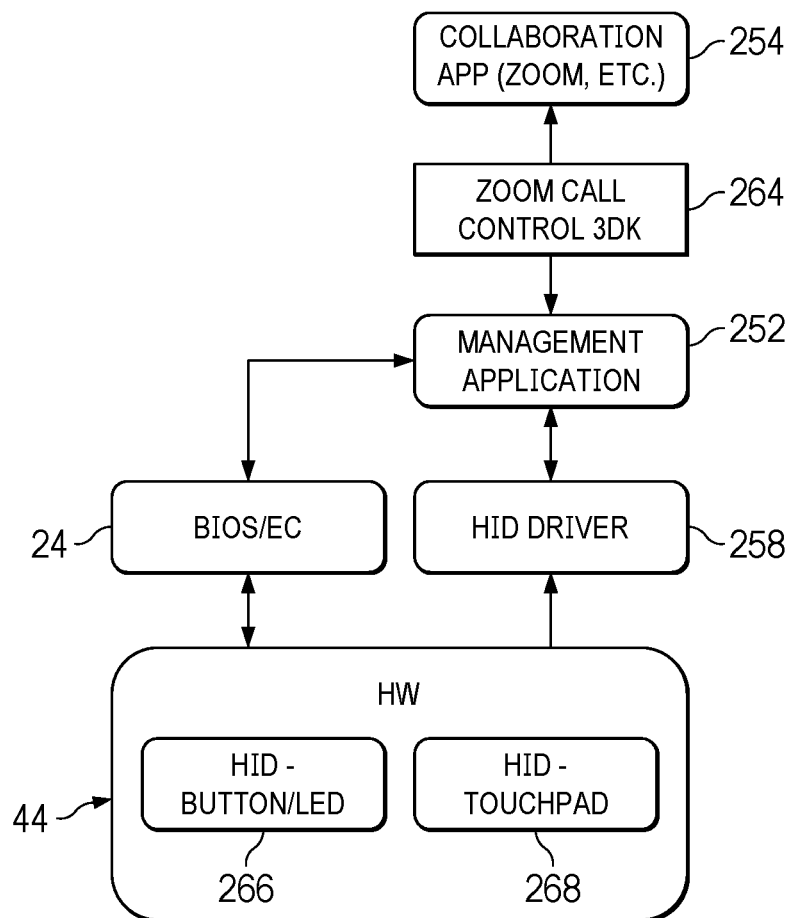
FIGS. 15A and 15B depict a flow diagram of an example embodiment of communication between a collaborative touchpad and an application, such as to support turning on/off LEDs.

Referring now to FIG. 15A, a flow diagram depicts an example embodiment of communication between a collaborative touchpad and application, such as to perform dynamic dimming of touchpad LEDs. FIG. 15A provides a high level view of overall software and hardware architecture that supports management of touchpad LED brightness to illuminate control icons. Management application 252, such as the DELL Optimizer, coordinates translation between a videoconference application or other collaboration application 254, such as ZOOM, and touchpad hardware devices through an application call control SDK 264. For example the management application plays "traffic cop" by synchronizing presentation of control icon states at the collaboration application 254 and the touchpad control icons, such as showing mute and camera on/off states at both places. The management application 252 accomplishes synchronization using collaboration application 254 call control SDK 264 and HID driver commands that support communication with touchpad 44. For example, the call control SDK is used by the management application to get and set the status of the control icon features, such as microphone mute, camera mute, chat and share, as executed in the collaboration application. In an alternative embodiment, the collaborative application may interface directly with the operating system and HID driver 258 instead of through the management application, such as is set forth in greater detail below by FIGS. 15B and 21-26. HID commands to touchpad 44 processing resource logic 268 and control icon LED logic 266 are used to set the control icon states to an initially synchronized value on start and to update the control icon state at each update resulting from a command that changes the state. The coordination of touchpad inputs and control icon states is managed as needed through an embedded controller 24 and BIOS interface, such as by controlling the LED illumination for each control icon. For example, as is explained in greater depth below, some hardware devices like the microphone have a hardware state, such as a microphone mute, that is managed at the hardware device and not available to override through software management tools. In such instances, synchronization of control icons at touchpad 44 may involve coordination through various communication paths, including the embedded controller, BIOS, operating system and management application.

Figure 15B:
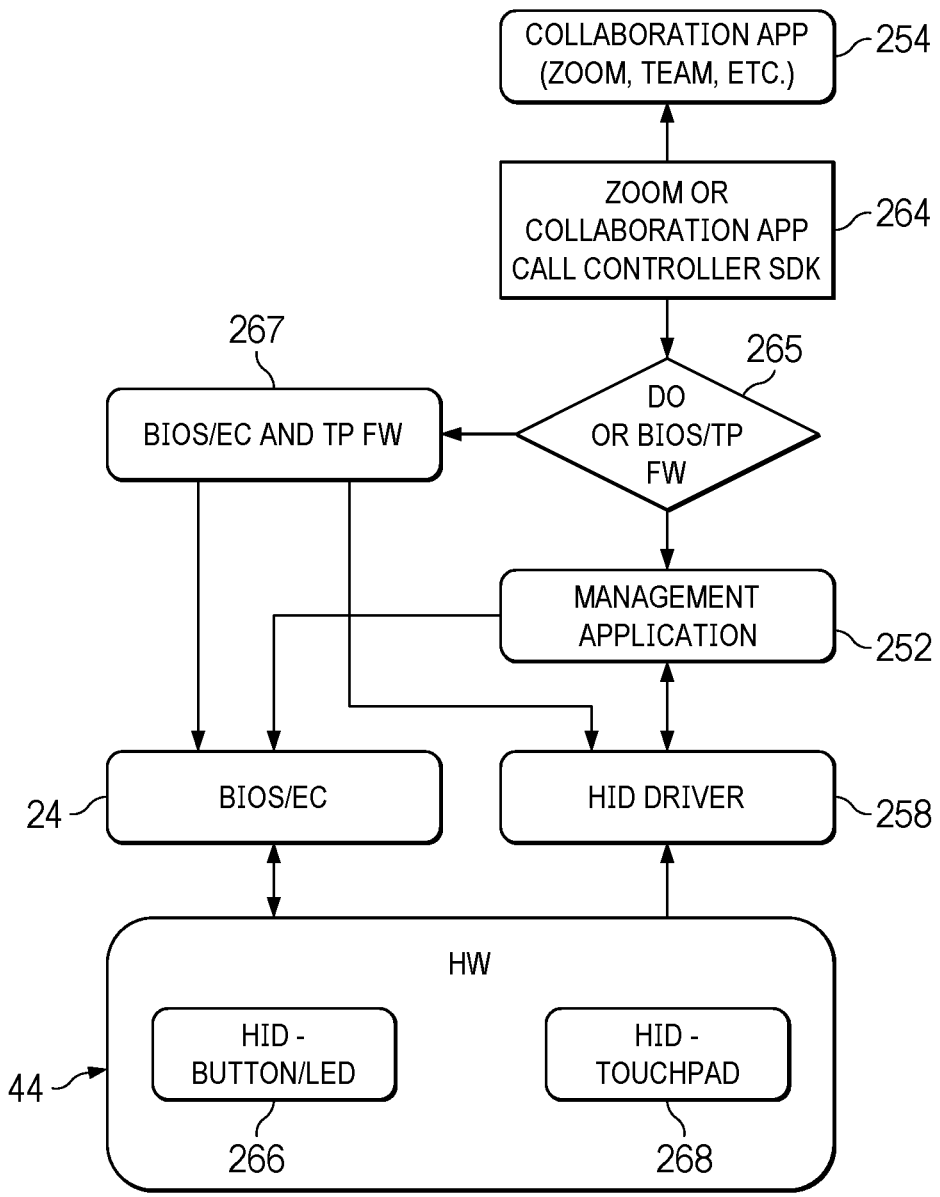

FIG. 15B depicts an alternative embodiment having interactions between the collaborative touchpad 44 and collaborative application 254 intermediated by both hardware and software functions. Management application 252 offers software intermediation as described above with respect to FIG. 15A. As an alternative that avoids middleware, the collaborative application 254 APK decides at step 265 whether to interact with the touchpad 44 through management application 252 or instead through coordinated resources of system BIOS, embedded controller and touchpad firmware. In the event that management application 252 is not available or not a desired solution, the process continues to step 267 to communicate touchpad display interactions through BIOS, embedded controller and touchpad firmware instructions. As is set forth in greater detail below with respect to FIGS. 21-26, BIOS ACPI communication functions may be defined that communicate the status of the touchpad display to present control icons, remove presentation of control icons and to synchronize the status of the control icons with related input icons of collaborative application 254.

Figure 16:
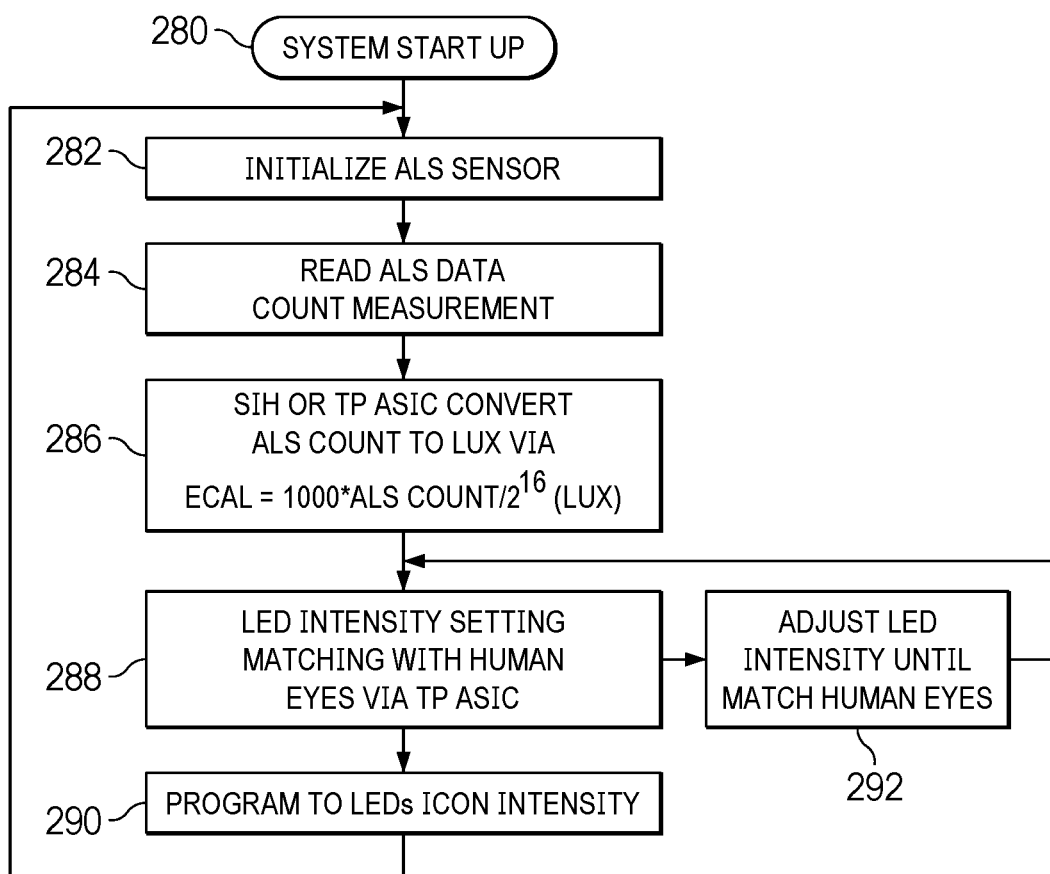
FIG. 16 depicts a flow diagram of a process for adjusting touchpad control icon brightness based upon ambient light conditions.

Referring now to FIG. 16, a flow diagram depicts a process for adjusting touchpad control icon brightness based upon ambient light conditions. At step 280 the system starts up and at step 282 initializes the ambient light sensor. At step 284, ambient light conditions are read from the ambient light sensor. At step 286, ambient light conditions are converted to values usable by the touchpad processing resource, such as converting the ambient light sensor count to LUX values with a formula as indicated. At step 288 the touchpad LED brightness intensity setting is changed to match the human eye via the touchpad processing resource. The process loops through step 292 to adjust the LED intensity until a match is accomplished. Once a match is accomplished at step 288, the process continues to step 290 to program the LED intensity for presentation of the control icons at the touchpad.

Figure 17:
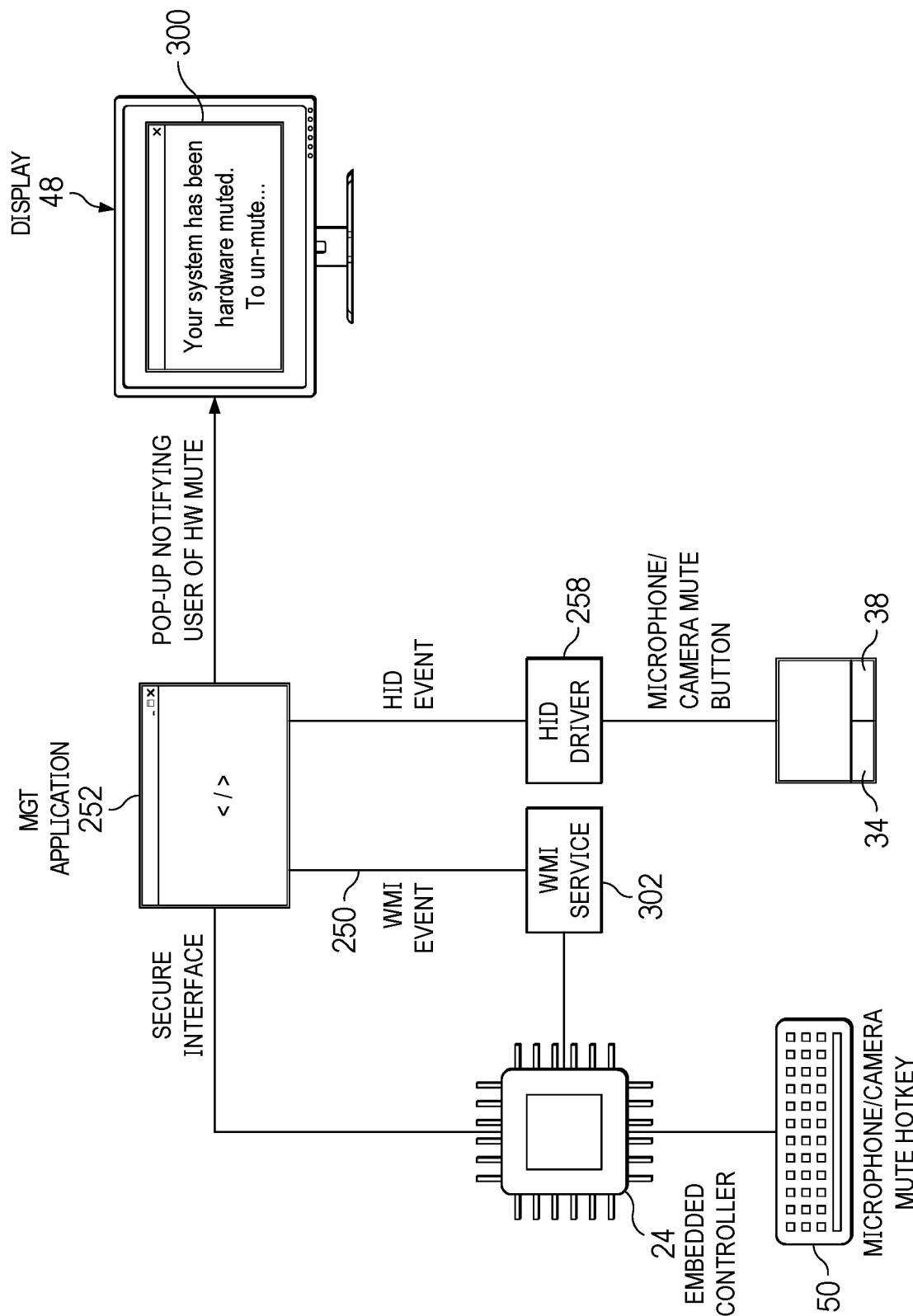
FIG. 17 depicts a block diagram of a system and process to accomplish communication of hardware device settings with a touchpad display that presents control icons.

Referring now to FIG. 17, a block diagram depicts a system and process to accomplish communication of hardware device settings with a touchpad display that presents control icons. In the example embodiment, keyboard 50 includes a microphone and/or camera having a "hardware" mute hotkey. The hardware mute turns off the microphone and/or camera functionality with a direct hardware interface that system software cannot change. The hardware mute may include a power off switch or a physical blocking of the hardware device from access to environment sounds and/or images. In the example embodiment, embedded controller 24 directly interfaces with the hardware device to determine the hardware device hardware settings through a management bus, such as an I2C bus. In one example embodiment, embedded controller 24 determines the hardware state by inquiring from the hardware device, such as to determine power is off at the device or visual and audio information is blocked by a closed shutter or other obstruction. For instance, a hardware mute state may be deduced by the embedded controller if no visual images are captured or no audio is captured. In one embodiment, the hardware device status is checked by embedded controller 24 at system start and stored locally for reference in the event that the touchpad display is activated.

Embedded controller 24 provides the hardware mute status to management application 252 and a WMI service 302 as an event when the status changes. At touchpad 44, an end user input to change a microphone or camera mute status is communicated to an HID driver 258 and the management application 252 to perform the mute command with software communications. When the change in mute command is communicated by HID driver 258 to management application 252, a determination is made of whether a hardware state exists that prevents change in mute state. For example, a command to unmute a microphone that is muted with a hardware device setting cannot be performed through the management application or embedded controller. In response to the unmute command, the management application presents a user interface 300 at the peripheral display 48 to inform the end user that the unmute command cannot be performed and that the end user must perform the unmute through a hardware device interface. Management application 252 also sends a response through HID driver 258 to touchpad 44 to maintain the hardware control icon as depicting the muted status. In one example embodiment, management application 252 commands the touchpad display to present the control icon with a notice specific to the hardware state so that the end user is provided with an indication that a hardware mute is selected, such as an X through the control icon or removal of the control icon when inputs cannot be accepted through the control icon.

Figure 18:
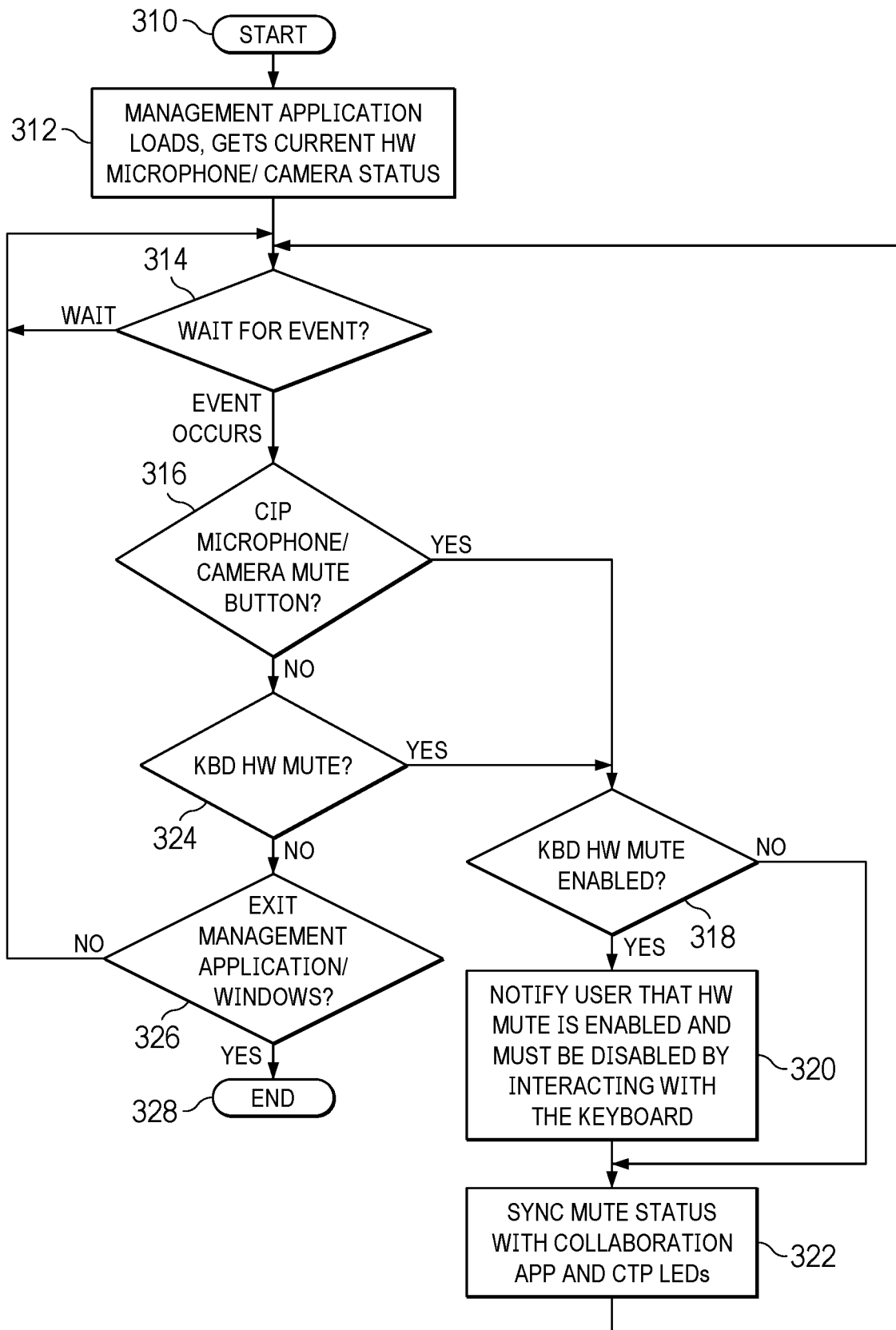
FIG. 18 depicts a flow diagram of a process for managing hardware device status presentation at control icons of a touchpad display.

Referring now to FIG. 18, a flow diagram depicts a process for managing hardware device status presentation at control icons of a touchpad display. The process starts at step 310 with power up of the system and at step 312 the management application loads and gets the current hardware device status, such as by inquiring whether a hardware camera and/or microphone mute is selected. At step 314, the management application waits for an event to be reported related to a hardware device state, such as a WMI event. When an event occurs, the process continues to step 316 to determine if the touchpad microphone and/or camera mute button is pressed. If not, the process continues to step 324 to determine if the keyboard hardware mute button was pressed. If not, the process continues to step 326 to determine if an exit is commanded from the management application. If an exit is commanded the process ends at step 328, and if not the process returns to step 314 to wait for the next event.

At steps 316 and 324, when the event relates to a change in a hardware device mute, the process continues to step 318 to determine if the keyboard hardware device hardware mute is selected. If the hardware device hardware mute is selected so that a touchpad mute cannot be performed, the process continues to step 320 to inform the end user that a hardware mute is selected that has to be disabled by interacting with keyboard or other hardware device. After informing the end user that the hardware device cannot be changed by the touchpad control icon input, the process continues to step 322 to synchronize the touchpad display control icons and the collaboration control icons with the hardware device status. The process then returns to step 314 to wait for the next event. In one example embodiment, while waiting for the next event, the process periodically checks the hardware device hardware status to keep the touchpad control icons synchronized with hardware selected states.

Figure 19A:
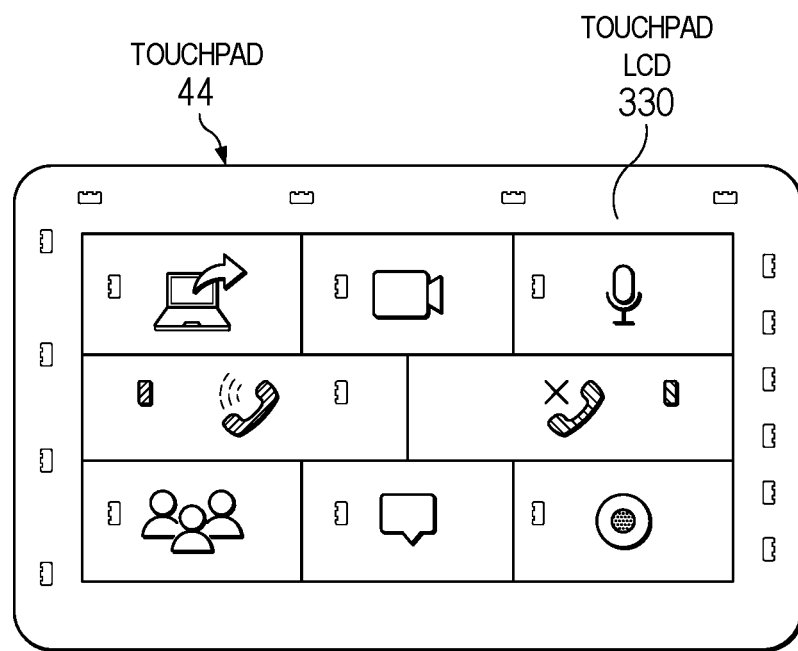
FIGS. 19A and 19B depict examples of control icon presentations provided at a touchpad display that support both control icon inputs and cursor inputs across the touchpad touch detection surface.
Figure 19B:
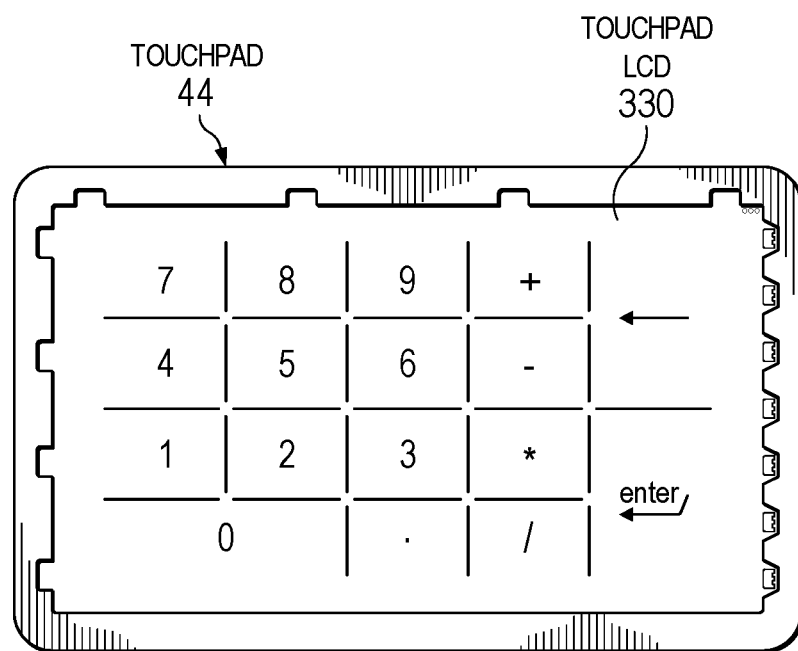

Referring now to FIGS. 19A and 19B, examples depict control icon presentations provided at a touchpad display that support both control icon inputs and cursor inputs across the touchpad touch detection surface. FIG. 19A depicts an LCD display panel 330 under the touch detection surface of the touchpad 44 that presents a plurality of additional control icons, such as a record button, a call button, and a hand-up button. FIG. 19B depicts a calculator presented by an LCD display panel 330 under the touchpad 44 touch detection surface. Rather than dividing the touch detection surface into defined portions as described above, such as an application portion with control icons and a cursor input portion, the touch functionality is dividing logically so that both cursor input and control icon inputs are detected across the entirety of the touchpad surface. For example, dragging finger motions are always applied as cursor movement inputs while finger taps and/or double finger taps are applied as enter commands to the touchpad when control icons are not presented and always applied as control icon inputs when control icons are presented. Alternatively, finger taps and/or double taps may be applied and enter commands when entered a greater than a defined distance to a control icon and as a control icon input when the touch is within a defined distance of the control icon. Other types of logical differentiation may include having single finger taps applied as control icon inputs and double finger taps as touchpad enter commands; applying finger taps as touchpad input commands when the tap occurs within a defined time of a cursor finger drag input; and defining by the touchpad display a location at which a touchpad enter command can be performed.

Figure 20:
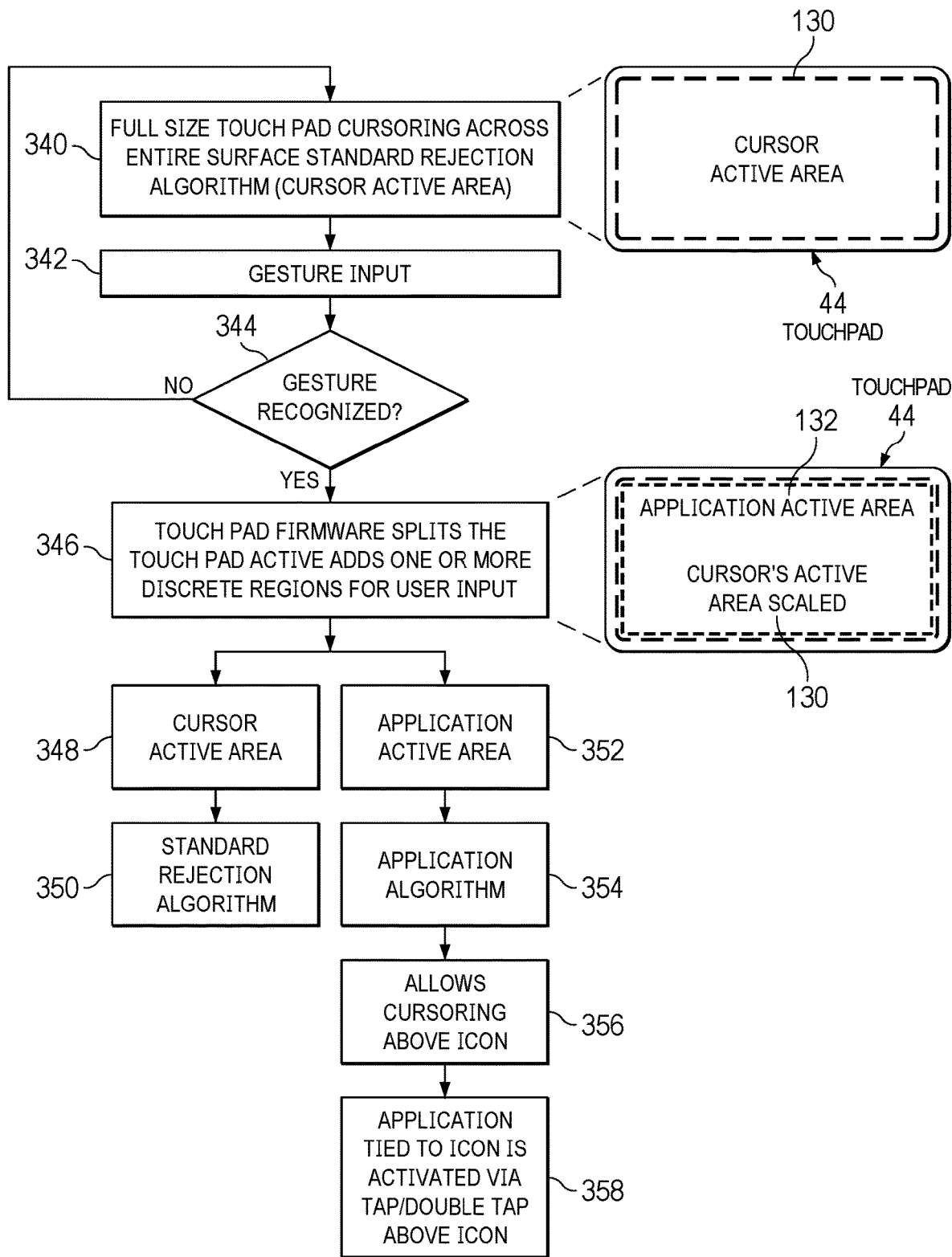
FIG. 20 depicts a flow diagram of a process for presenting control icons at a touchpad display that shares the touch detection surface with cursor input touches.

Referring now to FIG. 20, a flow diagram depicts a process for presenting control icons at a touchpad display that shares the touch detection surface with cursor input touches. The process starts at step 340 with touchpad 44 having the full touch detection surface assigned as a cursor active area 130 and accepting cursor inputs and enter commands with a standard cursor input touch rejection algorithm. At step 342 a gesture input is detected and at step 344 a determination is made of whether the gesture is recognized. In one example embodiment, the gesture may include a finger touch pattern that specifies the type of touchpad display that is desired for presentation, such as an application control icon set or a calculator. If at step 344 the gesture is not recognized, the process returns to step 340. If the gesture is recognized, the process continues to step 346 to present with the touchpad firmware instructions the selected control icons with one or more discrete regions that are defined and each associated with a type of touch input analysis. In the example embodiment, an application active area 132 is assigned to the entire touchpad touch detection surface overlapping the cursor active area, which remains assigned to the entire surface. In alternative embodiments, application active area 132 may overlap some but not all of cursor active area 130 so that the area assigned only as a cursor active area can accept tap and double tap inputs associated with cursor inputs.

Once the cursor active area and application active areas are defined to include at least some overlap, the process continues to steps 352 and 348 with a first set of instructions interpreting touches as inputs to the cursor active area and a second set of instructions interpreting touches as inputs to the application active area. At step 348 touches at the cursor active area are analyzed at step 350 with a standard cursor touch rejection algorithm. In one embodiment, the standard cursor algorithm may be modified to exclude certain touches assigned to application control icon touches, such as taps and or double taps. At step 352, touches at the application active area are analyzed at step 354 with the application algorithm, such as to detect touches associated with inputs to the visual images presented at the touchpad display. At step 356, the application active area rejects touches that are cursoring inputs so that a finger trace over a control icon does not trigger an input to the control icon. At step 358 touches tied to an application icon trigger an input to the icon when defined conditions are met. For instance, a touch is an icon input when the touch is within a predetermined distance to a control icon and/or has a predetermined pattern, such as a tap or a double tap.

Figure 21:
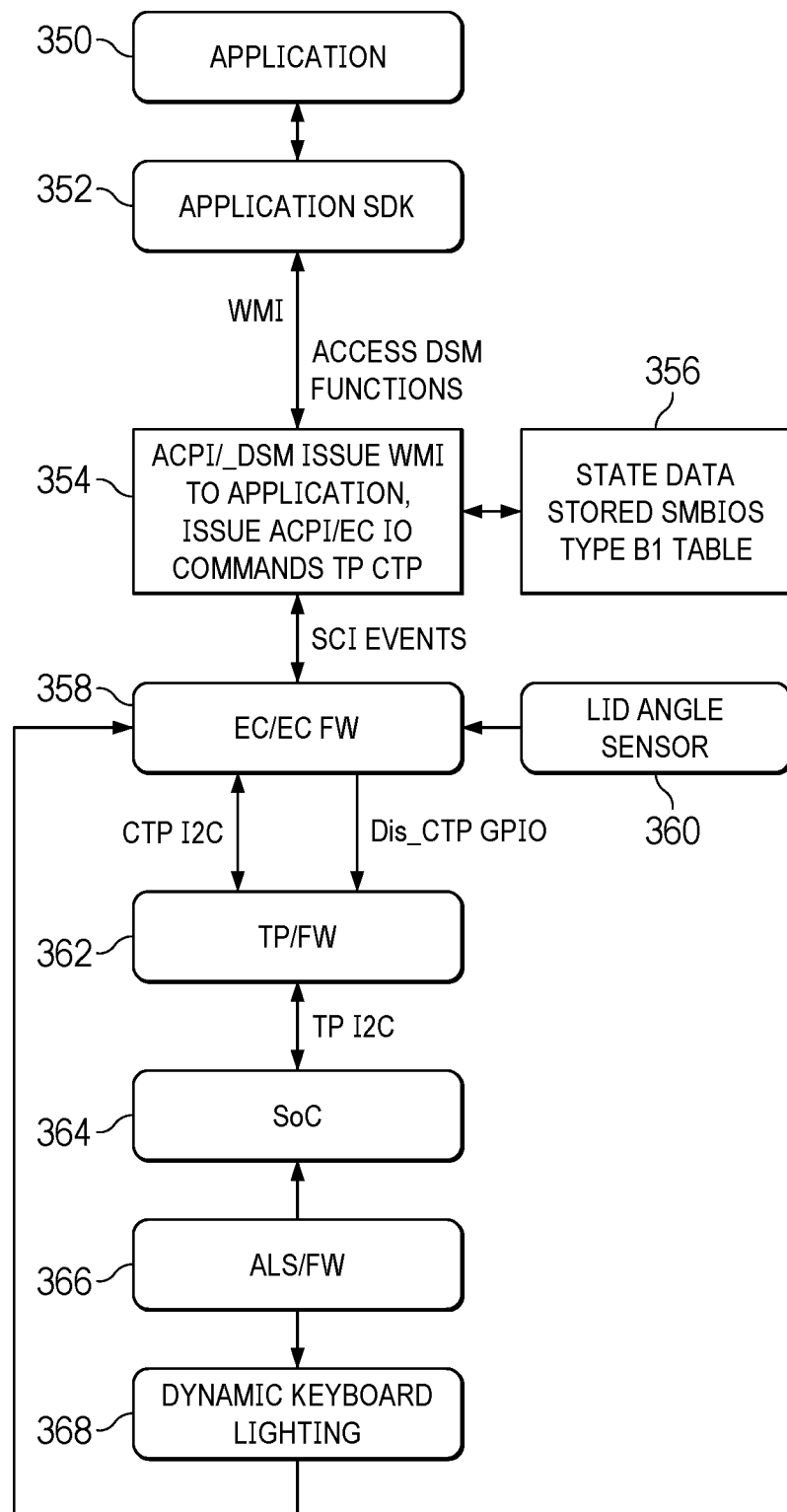
FIG. 21 depicts a block diagram of an alternative embodiment that manages presentation of visual images at collaborative touchpad without a middleware management application.

Referring now to FIG. 21, a block diagram depicts an alternative embodiment that manages presentation of visual images at collaborative touchpad without a middleware management application. In the example embodiment, the management application is bypassed to implement at collaborative touchpad display presentation with an BIOS/ACPI (Advanced Control and Power Interface) DSM (Device Specific Method). The alternative arrangement simplifies implementation by operating system related applications, such a MICROSOFT TEAMS executing over WINDOWS, and alternative application suites, such as WEBEX. The collaborative application 350, such as ZOOM, TEAMS, WEBEX or other communications suites, interfaces with hardware devices through an application SDK 352 that uses WMI events to access DSM functions at an ACPI/DSM module 354, which issues WMI to application events and commands for ACPI embedded controller input/output commands to a touchpad firmware module 362. State data to the touchpad display visual image presentation and the information handling system context are stored in an SMBIOS table. ACPI/DSM module 354 communicates by SCI events with the embedded controller firmware 358. In the example embodiment, a lid angle sensor 360 provides the embedded controller with the portable housing angular orientation. An ambient light sensor firmware 366 provides illumination control inputs to a dynamic keyboard backlight 368, which in turn communicates the ambient light conditions to the embedded controller firmware 358. A system on chip (SOC) 364 processing resource and embedded controller firmware 358 each interface with touchpad firmware 362 to achieve collaborative touchpad functions as described above but without the use of a middleware management application.

In operation, an operating system agent of the application uses ACPI device DSM methods to interact with the platform BIOS SMM handlers to perform the communication between the applications and the touchpad. The DSM method includes a variety of input parameters, such as a unique identifier; a version identifier; an application start/end/plural starts with a data format assigned to each; a function index for application state changes that synchronize to the touchpad; and a function index for touchpad display state changes to synchronize to the application. In addition, other operations and functions may be supported with ACPI/DSM commands, such as setting the touchpad display brightness based upon ALS sensed ambient light conditions.

Figure 22:
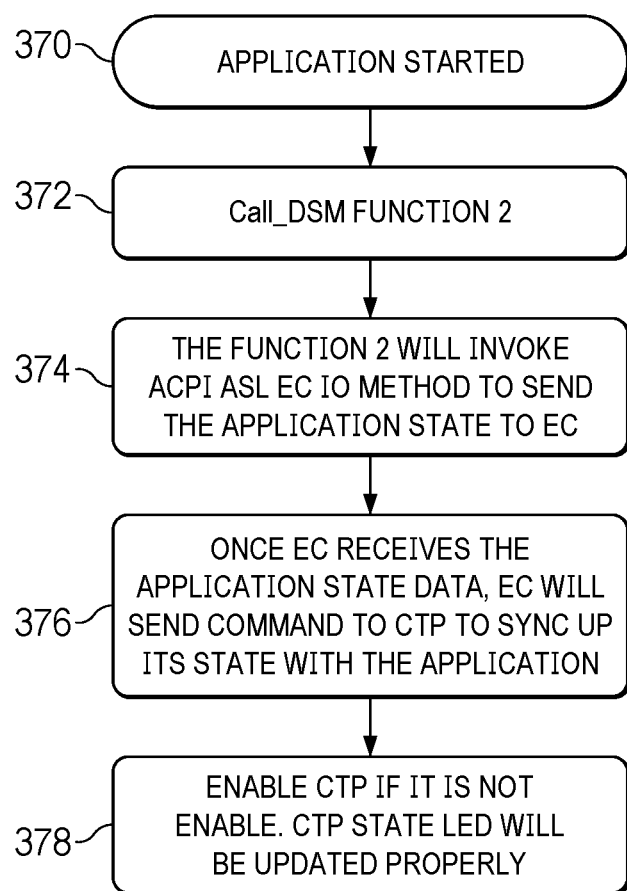
FIG. 22 depicts a flow diagram of a process for enabling a touchpad display presentation.

Referring now to FIG. 22, a flow diagram depicts a process for enabling a touchpad display presentation. The process starts at step 370 when the application starts and at step 372 calls the DSM function two for updating touchpad states from an application. At step 374 the function two invokes ACPI ASL EC IO method to send the application state to the embedded controller. At step 376 the embedded controller receives the application state data and send a command to the collaborative touchpad to synchronize the touchpad display with the application. At step 378 the touchpad display is enabled and illuminated, such as with an LED.

Figure 23:
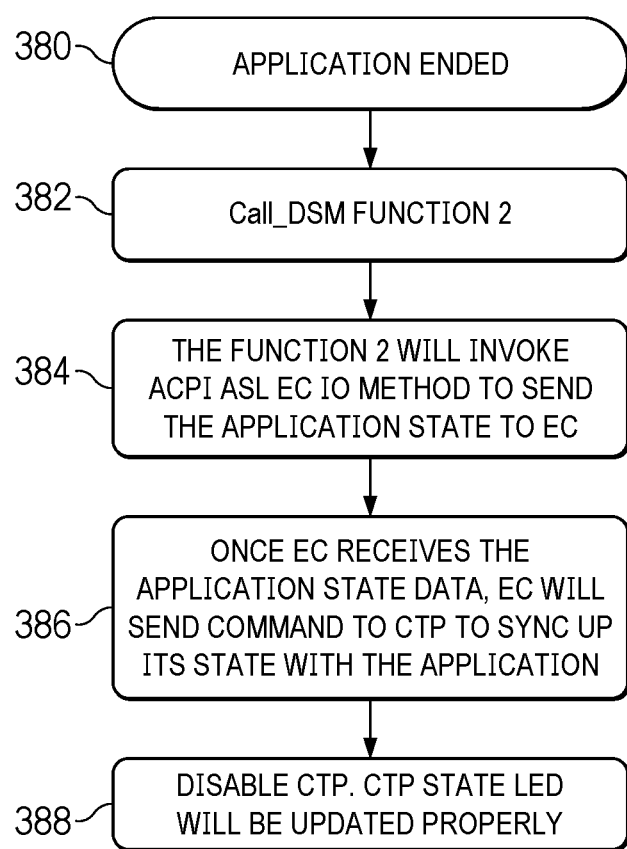
FIG. 23 depicts a flow diagram of a process for disabling a touchpad display presentation.

Referring now to FIG. 23, a flow diagram depicts a process for disabling a touchpad display presentation. The process starts at step 380 with termination of execution of the application. At step 382 the DSM function two is called to invoke the ACPI ASL EC IO method to send the application data to the embedded controller. At step 386, the embedded controller receives the application state data and sends a command to the collaborative touchpad to synchronize its state with the application. At step 388 the touchpad disables presentation at the touchpad display and the LED illumination is ended.

Figure 24:
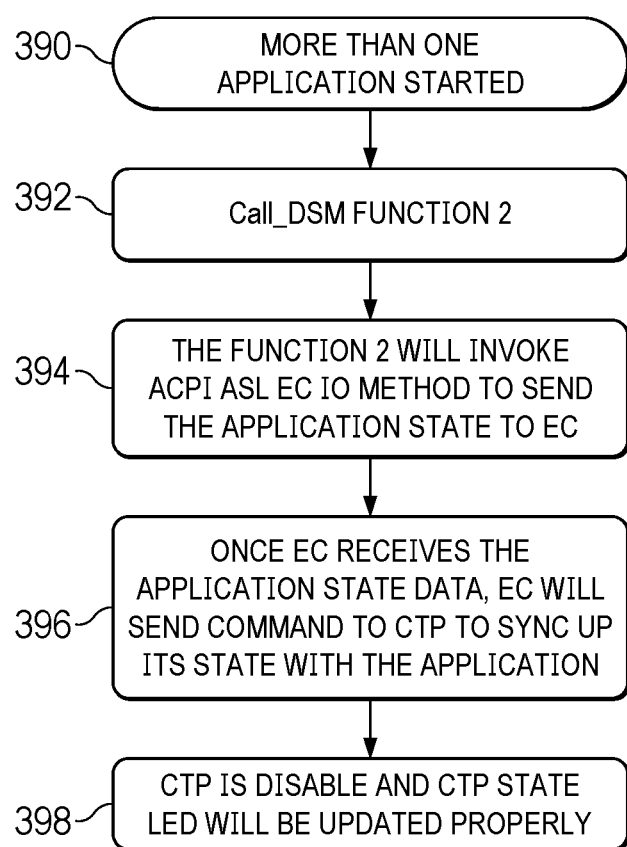
FIG. 24 depicts a flow diagram of a process for managing plural applications that interact with a touchpad display contemporaneously.

Referring now to FIG. 24, a flow diagram depicts a process for managing plural applications that interact with a touchpad display contemporaneously. The process starts at step 390 with detection that more than one collaborative application has started that can interact with the touchpad display. The process continues to step 392 to call the DSM function two and step 394, which invokes the ACPI ASL EC IO method to send the application state to the embedded controller. At step 396, the embedded controller receives the application state data and commands the collaborative touchpad to synchronize it touchpad display state with the active application. At step 398 the inactive collaborative touchpad display presentation is disabled so that the active application can access the touchpad display. Control of the touchpad display may shift between applications based on a variety of factors, such as which application window is active or a priority assigned to each application.

Figure 25:
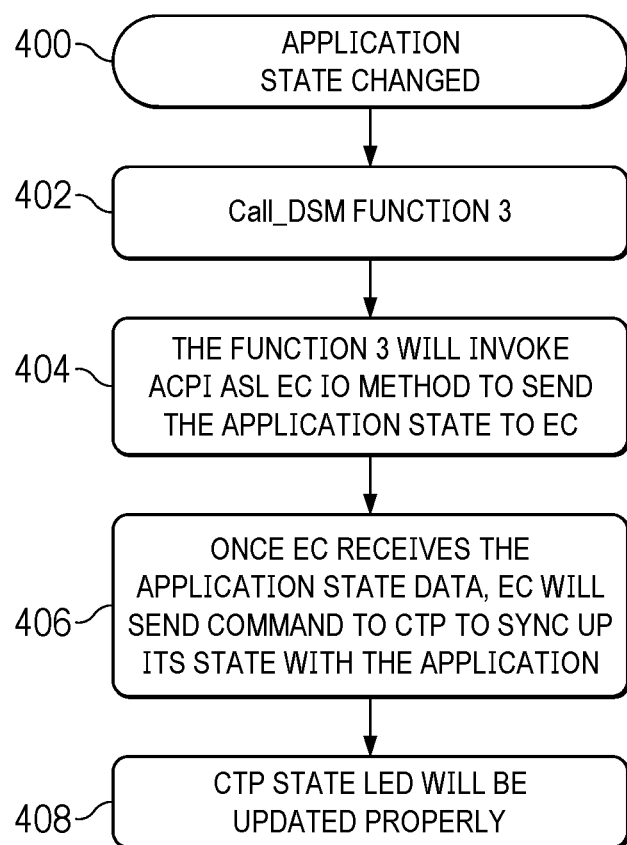
FIG. 25 depicts a flow diagram of a process for updating a touchpad state from an application.

Referring now to FIG. 25, a flow diagram depicts a process for updating a touchpad state from an application. The process starts at step 400 with a change in the application state. At step 402 the DSM third function is called, which at step 404 invokes ACPI ASL EC IO method to send the application state to the embedded controller. At step 406 the embedded controller receives the application state data and sends a command to the collaborative touchpad to synchronize the touchpad display state with the application state. At step 408, the collaborative touchpad display state is updated to show the application state at the control icons.

Figure 26:
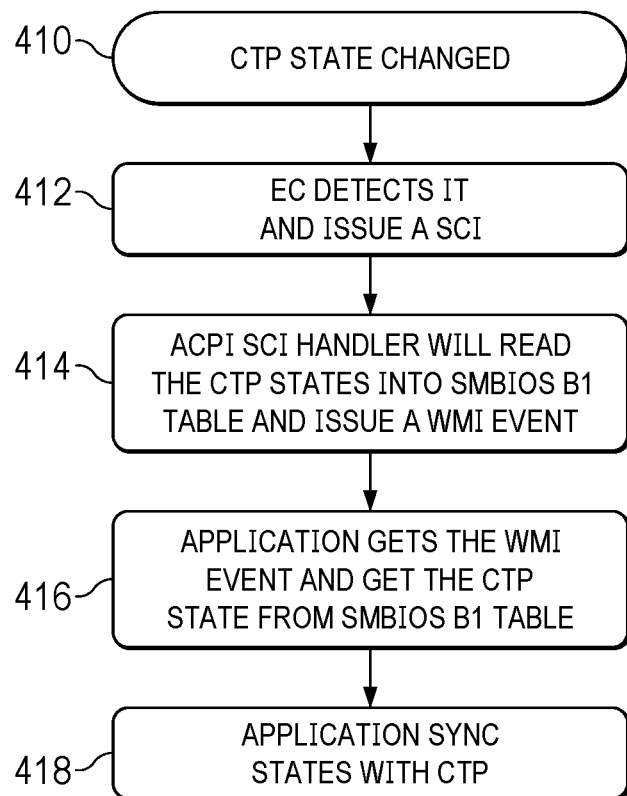
FIG. 26 depicts a flow diagram of a process for updating an application state from a touchpad display presentation.

Referring now to FIG. 26, a flow diagram depicts a process for updating an application state from a touchpad display presentation. The process starts at step 410 with a change of state at a collaborative touchpad, such as by a touch input to a control icon. At step 412 the embedded controller detects the change in state and issues an SCI. At step 414, the ACPI SCI handler reads the touchpad state into the SMBIOS B1 table and issues a WMI event. At step 416 the application gets the WMI event and the touchpad state from the SMBIOS B1 Table. At step 418 the application synchronizes the application icon presentation with the state selected at the collaborative touchpad.

Although the present invention has been described in detail, it should be understood that various changes, substitutions and alterations can be made hereto without departing from the spirit and scope of the invention as defined by the appended claims.

What is claimed is:

1. An information handling system comprising: a housing; a processor disposed in the housing and operable to execute instructions to process information; a memory interfaced with the processor and operable to store the instructions and information; a display included in the housing and interfaced with the processor, the display operable to present the information as visual images; one or more hardware devices interfaced with the processor and having a hardware control interface to select an operational state of a function of the hardware device, the hardware control interface including at least a keyboard hot key to command the operational state of the function of the hardware device; an embedded controller interfaced with the processor and the one or more hardware devices; a persistent storage device having memory storing an operating system and an application configured to execute as instructions on the processor; a touchpad included in the housing separate from the display and having a touch detection surface, a processing resource, a touchpad display and a non-transitory memory interfaced with the processing resource, the touchpad display having a light guide to illuminate icons formed at a portion of the touch detection surface; and instructions stored in the non-transitory memory that when executed on the processing resource cause the touchpad touch detection surface to detect cursor movement inputs, to communicate the cursor movement inputs to move presentation of a cursor on the display, and to selectively present control icons of the application at the touchpad display, the control icons presenting the operational state of the hardware device selected by the hardware control interface and communicated to the touchpad, the instructions further synchronizing the control icon operational state with the hardware control interface through the embedded controller and a management application executing on the processor.

2. The information handling system of claim 1 wherein the instructions when executed on the processing resource further cause:
  detection of a touch at the control icons to command a change of the operational state of the hardware device; and
  communication of the command to change the operational state to the hardware device.

3. The information handling system of claim 2 wherein the instructions when executed on the processing resource further cause:
  receipt at the touchpad of a communication of the operational state of the hardware device as set by the hardware control interface; and
  presentation of the operational state at the control icons as received instead of as selected by the command.

4. The information handling system of claim 3 wherein the application comprises instructions that when executed on the processor cause presentation at the display of a message indicating that the touchpad command to change the operational state cannot be performed due to a selection of the hardware control interface.

5. The information handling system of claim 4 wherein the hardware device comprises a microphone and the operational state comprises a mute.

6. The information handling system of claim 4 wherein the hardware device comprises a camera and the operational state comprises the camera on to capture visual images.

7. The information handling system of claim 6 wherein the application detects a camera shutter blocks the camera lens.

8. The information handling system of claim 4 wherein the application comprises the touchpad driver.

9. The information handling system of claim 4 wherein the application comprises a management application executing over an operating system and interfacing with the hardware control interface through the embedded controller.

10. A method for presenting visual images at a touchpad display included in a touchpad of an information handling system, the method comprising:
  presenting visual images of an application at a display of the information handling system, the visual image including a cursor and application control icons of a hardware device;
  managing inputs to the control icons with communication to a hardware device controller of the hardware device, the managing including at least a keyboard hot key to command the hardware device;
  presenting the application control icons at a touchpad display of a touchpad included in the information handling system and separate from the display;
  detecting touches at the touchpad to move the cursor;
  moving the cursor at the display in response to the touches;
  detecting a touch input at one of the application control icons of the touchpad;
  communicating from the touchpad to the hardware device controller to command a change of an operational state of a hardware device controlled by the one of the application control icons; and
  communicating from the hardware device controller to the touchpad that an existing hardware device operational state prevents application of the command.

11. The method of claim 10 further comprising:
presenting the existing hardware device operational state at the one of the plural icons; and
presenting at a display of the information handling system a message indicating that the touchpad command to change the operational state cannot be performed due to a selection of the hardware control interface.

12. The method of claim 11 wherein:
the hardware device comprises a microphone; and
the command comprises a command to mute the microphone.

13. The method of claim 11 wherein:
the hardware device comprises a camera; and
the command comprise a command to turn capture of visual images by the camera.

14. The method of claim 11 further comprising:
querying from the touchpad to the hardware controller for the existing hardware device operational state; and
indicating at the one of the control icons when the existing hardware device operational state prohibits the command to change the operational state of the hardware device.

15. The method of claim 14 wherein the hardware controller comprises an embedded controller of the information handling system.

16. The method of claim 15 wherein communication between the hardware device and touchpad is coordinated through an operating system driver of the touchpad and an application executing over an operating system of the information handling system.

17. The method of claim 15 wherein the information handling system comprises a portable housing integrating the display and touchpad.

18. A touchpad comprising:
  a touch detection surface configured to couple to a housing proximate a keyboard;
  a touchpad display disposed to present visual images at the touch detection surface;
  a processing resource interfaced with the touch detection surface and touchpad display; and
  a non-transitory memory interfaced with the processing resource and storing instructions that when executed on the processing resource cause the touch detection surface to detect cursor movement inputs, to communicate the cursor movement inputs to a controller that moves a cursor at a display device separate from the touchpad and to selectively present control icons of an application at the touchpad display, the control icons presenting an operational state of a hardware device controllable by a hardware control interface, the hardware control interface including at least a keyboard hot key to command the operational state of the function of the hardware device, the hardware control interface managing presentation of the operational state of the hardware device at a display separate from the touchpad and selectively prevents application of commands sent from the touchpad to change the operational state when the operational state presented by the touchpad display differs from an actual operational state.

19. The touchpad of claim 18 wherein the instructions when executed on the processing resource further cause:
   detection of a touch at the control icons to command a change of the operational state of the hardware device; and
   communication of the command to change the operational state to the hardware device.

20. The touchpad of claim 18 wherein the hardware device comprises a microphone and the operational state comprises a mute.

* * * * *